(12) United States Patent
Sun et al.

(10) Patent No.: US 10,454,106 B2
(45) Date of Patent: Oct. 22, 2019

(54) DOUBLE-LAYER CATHODE ACTIVE MATERIALS FOR LITHIUM SECONDARY BATTERIES, METHOD FOR PREPARING THE ACTIVE MATERIALS, AND LITHIUM SECONDARY BATTERIES USING THE ACTIVE MATERIALS

(75) Inventors: Yang Kook Sun, Seoul (KR); Myung Hoon Kim, Jeonrabukdo (KR); Shin Ho Suk, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 1726 days.

(21) Appl. No.: 11/794,287

(22) PCT Filed: Apr. 26, 2005

(86) PCT No.: PCT/KR2005/001193
§ 371 (c)(1),
(2), (4) Date: Jun. 26, 2007

(87) PCT Pub. No.: WO2006/070977
PCT Pub. Date: Jul. 6, 2006

(65) Prior Publication Data
US 2008/0160410 A1 Jul. 3, 2008

(30) Foreign Application Priority Data

Dec. 31, 2004 (KR) .................. 10-2004-0118280

(51) Int. Cl.
*H01M 4/36* (2006.01)
*H01M 4/485* (2010.01)
*H01M 4/04* (2006.01)
*H01M 4/505* (2010.01)
*H01M 4/525* (2010.01)
*H01M 4/58* (2010.01)
(Continued)

(52) U.S. Cl.
CPC ............ *H01M 4/485* (2013.01); *C01G 53/42* (2013.01); *C01G 53/50* (2013.01);
(Continued)

(58) Field of Classification Search
CPC .. H01M 4/366; H01M 4/0471; H01M 4/0497; H01M 4/485; H01M 4/505;
(Continued)

(56) References Cited

U.S. PATENT DOCUMENTS 5,744,258 A * 4/1998 Bai ..................... H01M 4/04
429/209
6,040,090 A 3/2000 Sunagawa et al.
(Continued)

FOREIGN PATENT DOCUMENTS

DE 19922522 A1 11/2000
JP 07235292 9/1995
(Continued)

*Primary Examiner* — Stephen J Yanchuk
(74) *Attorney, Agent, or Firm* — Sughrue Mion, PLLC

(57) ABSTRACT

Disclosed herein are double-layer cathode active materials comprising a nickel-based cathode active material as an inner layer material and a transition metal mixture-based cathode active material as an outer layer material facing an electrolyte. Since the nickel-based cathode active material as an inner layer material has high-capacity characteristics and the transition metal mixture-based cathode active material as an outer layer material facing an electrolyte has superior thermal safety, the double-layer cathode active materials have high capacity, high charge density, improved cycle characteristics and superior thermal safety.

12 Claims, 17 Drawing Sheets

(51) Int. Cl.
*H01M 10/42* (2006.01)
*C01G 53/00* (2006.01)
*H01M 4/583* (2010.01)
*H01M 10/052* (2010.01)

(52) U.S. Cl.
CPC ....... *H01M 4/0471* (2013.01); *H01M 4/0497* (2013.01); *H01M 4/366* (2013.01); *H01M 4/505* (2013.01); *H01M 4/525* (2013.01); *H01M 4/58* (2013.01); *H01M 4/5805* (2013.01); *H01M 10/4235* (2013.01); *C01P 2002/50* (2013.01); *C01P 2002/72* (2013.01); *C01P 2002/74* (2013.01); *C01P 2002/88* (2013.01); *C01P 2004/03* (2013.01); *C01P 2004/04* (2013.01); *C01P 2006/40* (2013.01); *H01M 4/582* (2013.01); *H01M 4/583* (2013.01); *H01M 10/052* (2013.01)

(58) Field of Classification Search
CPC ...... H01M 4/525; H01M 4/58; H01M 4/5805; H01M 10/4235; H01M 4/582; H01M 4/583; H01M 10/052; C01G 53/42; C01G 53/50; C01P 2002/50; C01P 2002/72; C01P 2002/74; C01P 2002/88; C01P 2004/03; C01P 2004/04; C01P 2006/40
USPC .......................................................... 429/223
See application file for complete search history.

(56) References Cited

U.S. PATENT DOCUMENTS

| | | | |
|---|---|---|---|
| 6,368,750 B1 * | 4/2002 | Nemoto et al. | 429/231.95 |
| 6,692,865 B2 | 7/2004 | Gan et al. | |
| 2002/0192552 A1 | 12/2002 | Lampe-Onnerud et al. | |
| 2003/0124422 A1 | 7/2003 | Cintra et al. | |
| 2003/0170542 A1 * | 9/2003 | Barker et al. | 429/231.9 |
| 2004/0058244 A1 * | 3/2004 | Hosoya et al. | 429/231.1 |
| 2004/0091779 A1 | 5/2004 | Kang et al. | |
| 2004/0110063 A1 * | 6/2004 | Uchitomi et al. | 429/223 |
| 2005/0260495 A1 * | 11/2005 | Onnerud | C01G 53/003 429/231.1 |
| 2006/0105239 A1 * | 5/2006 | Paulsen | H01M 4/131 429/231.3 |
| 2008/0131782 A1 * | 6/2008 | Hagiwara et al. | 429/231.95 |

FOREIGN PATENT DOCUMENTS

| | | |
|---|---|---|
| JP | 08 171910 | 2/1996 |
| JP | 09035715 | 2/1997 |
| JP | 09050810 | 2/1997 |
| JP | 09055210 A | 2/1997 |
| JP | 09 237631 | 9/1997 |
| JP | 10-172571 | 6/1998 |
| JP | 10236826 | 9/1998 |
| JP | 2000-195513 | 7/2000 |
| JP | 2000-227858 | 8/2000 |
| JP | 2001143708 | 5/2001 |
| JP | 2003-208894 | 7/2003 |
| JP | 2003272618 | 9/2003 |
| JP | 2004127694 | 4/2004 |
| JP | 2004533104 | 10/2004 |
| JP | 2004348981 | 12/2004 |
| JP | 2005-228706 | 8/2005 |
| KR | 2001-0047852 | 6/2001 |
| KR | 1020040062872 A | 7/2004 |
| WO | WO2004/040677 | * 10/2003 |

\* cited by examiner

[Fig. 1]
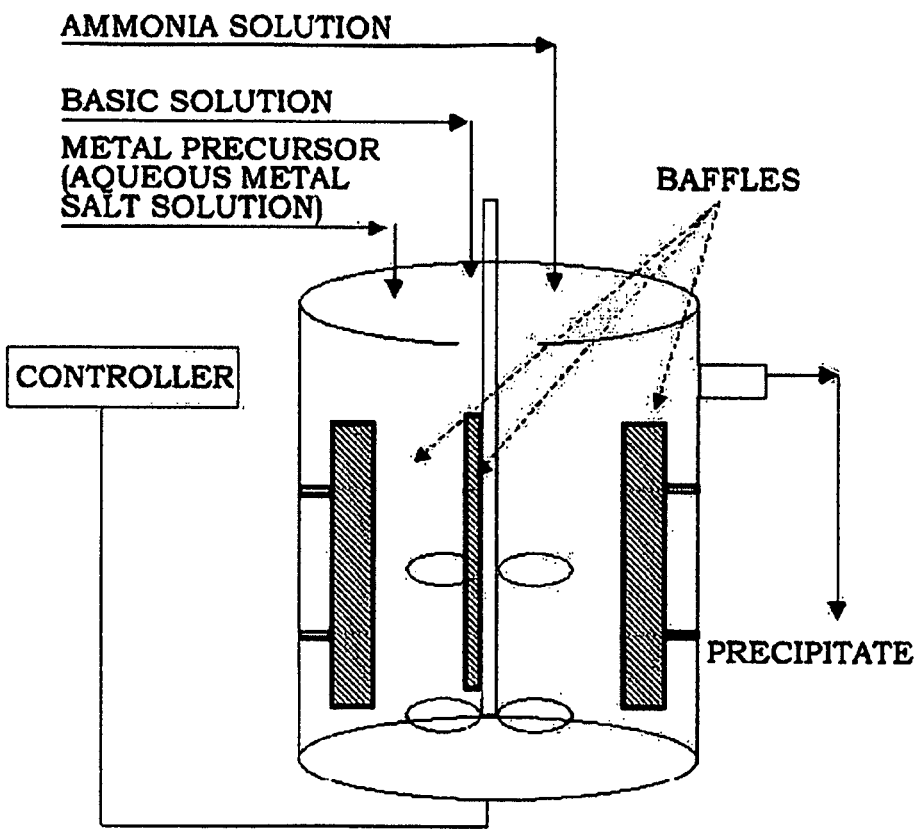
[Fig. 2]
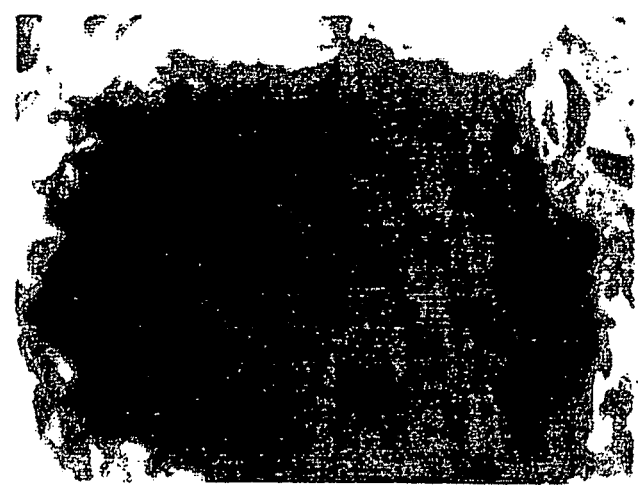
$(Ni_{0.8}Co_{0.1}Mn_{0.1})(OH)_2$ $(Ni_{0.8}Co_{0.1}Mn_{0.1})(OH)_2+(Ni_{0.5}Mn_{0.5})(OH)_2$ 1-2hr $(Ni_{0.8}Co_{0.1}Mn_{0.1})(OH)_2+(Ni_{0.5}Mn_{0.5})(OH)_2$ 2-3hr

[Fig. 5]
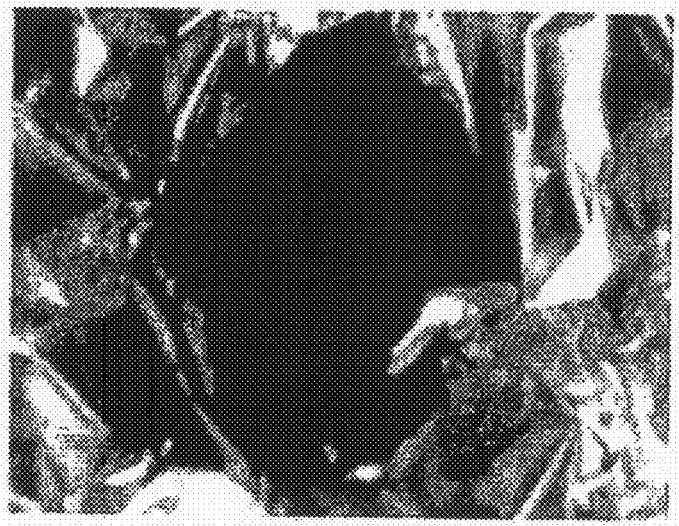
$(Ni_{0.8}Co_{0.1}Mn_{0.1})(OH)_2+(Ni_{0.5}Mn_{0.5})(OH)_2$ 4hr
[Fig. 6]
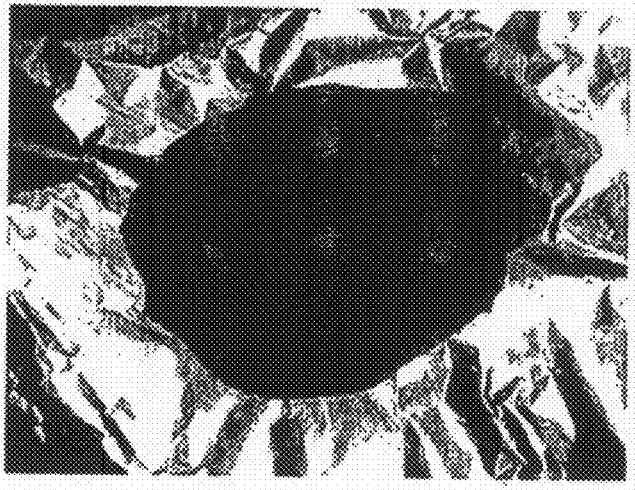
$(Ni_{0.8}Co_{0.2})(OH)_2$

[Fig. 7]
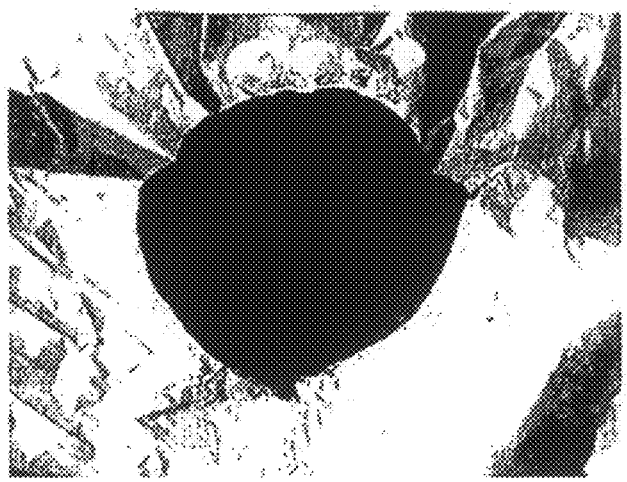
$(Ni_{0.8}Co_{0.2})(OH)_2 + (Ni_{0.45}Co_{0.1}Mn_{0.45})(OH)_2$ 1-2hr
[Fig. 8]
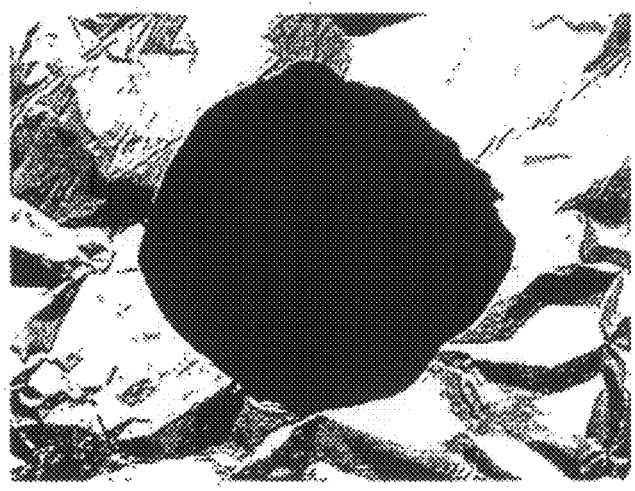
$(Ni_{0.8}Co_{0.2})(OH)_2 + (Ni_{0.45}Co_{0.1}Mn_{0.45})(OH)_2$ 3hr

[Fig. 9]
(1)
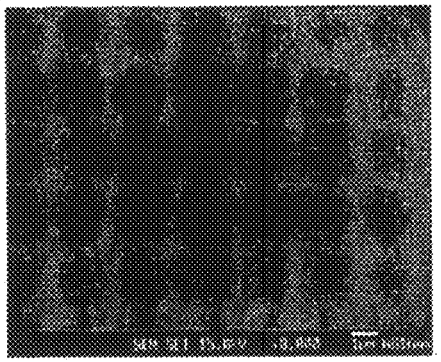
Ni BASE
(2)
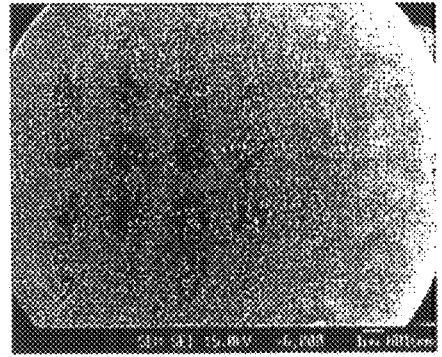
Ni + 1/2 (2hr)
(3)
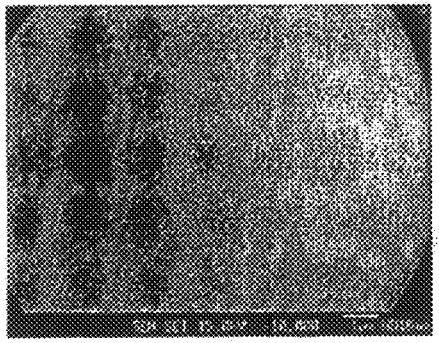
Ni + 1/2 (3hr)
(4)
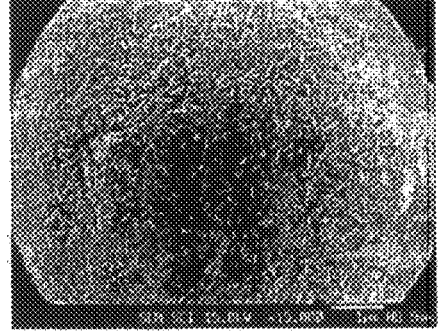
Ni + 1/2 (4hr)

[Fig. 10]
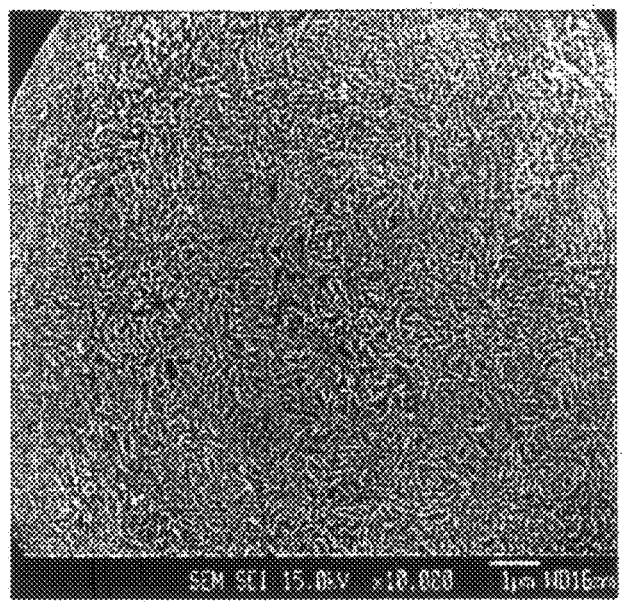
Ni + Co$_{0.1}$
[Fig. 11]
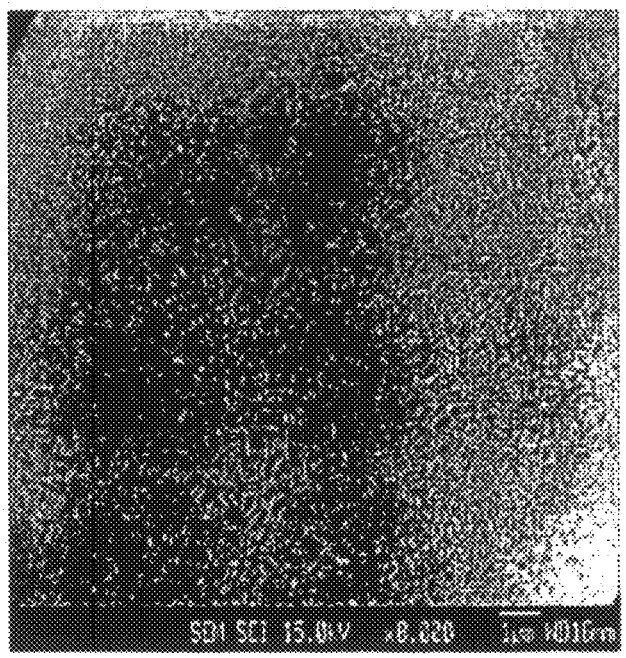
Ni + Co$_{0.2}$

[Fig. 12]
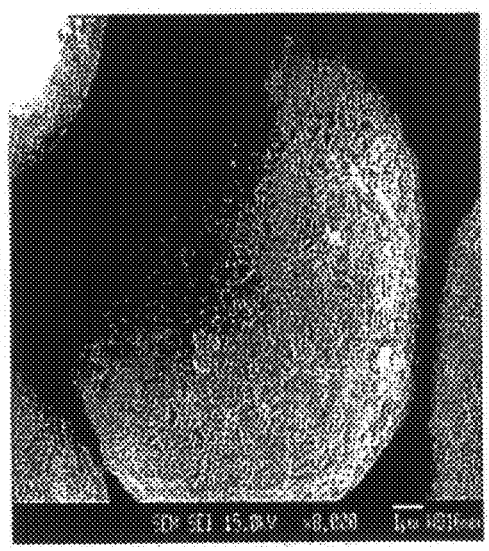 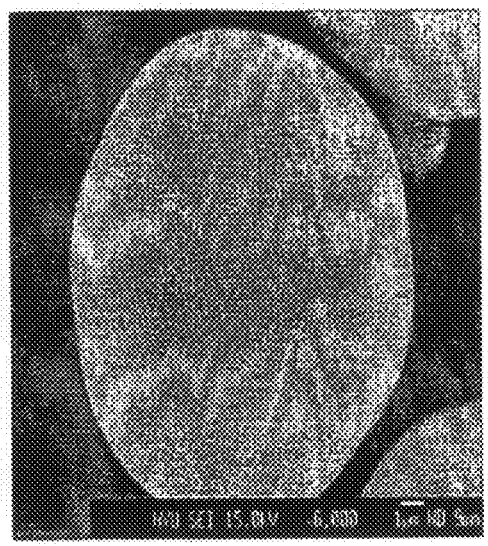
{Ni₀.₈Co₀.₂}(OH)₂        {Ni₀.₈Co₀.₂}(OH)₂ + {Ni₀.₄₆Co₀.₁Mn₀.₄₄}(OH)₂

[Fig. 13]
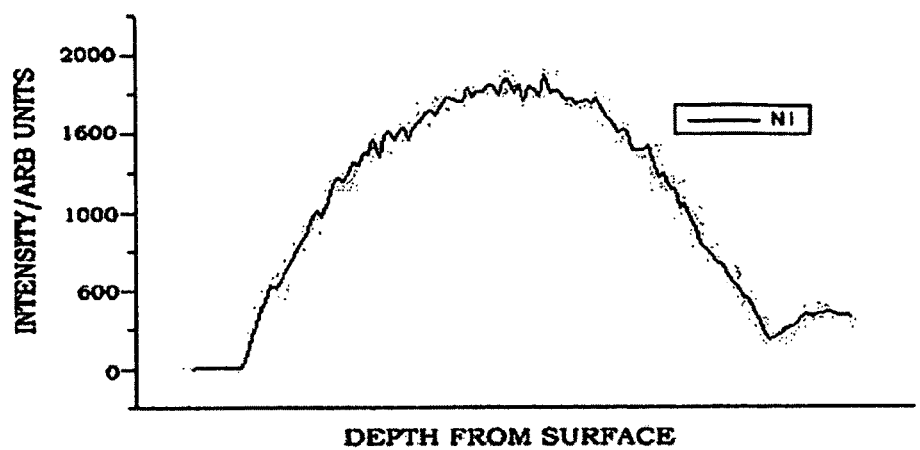
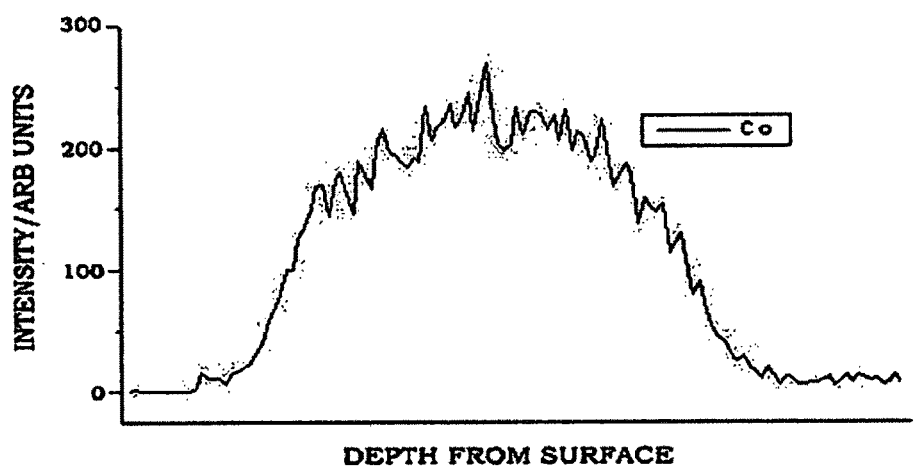
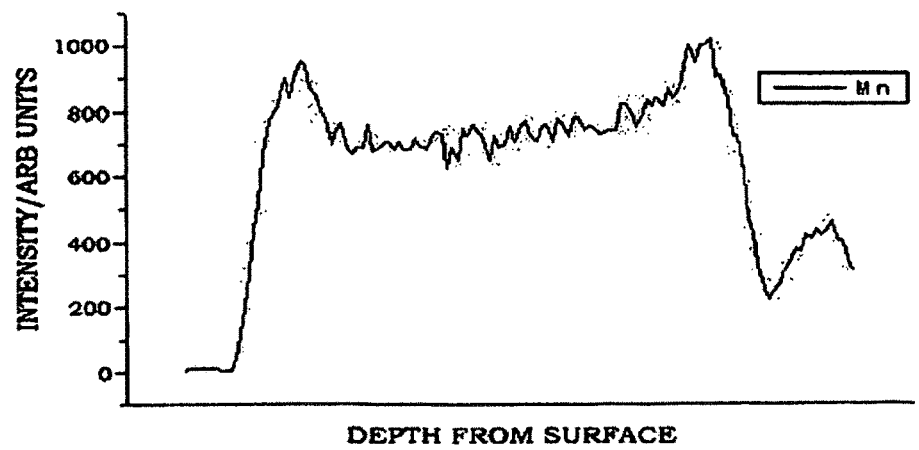

[Fig. 14]
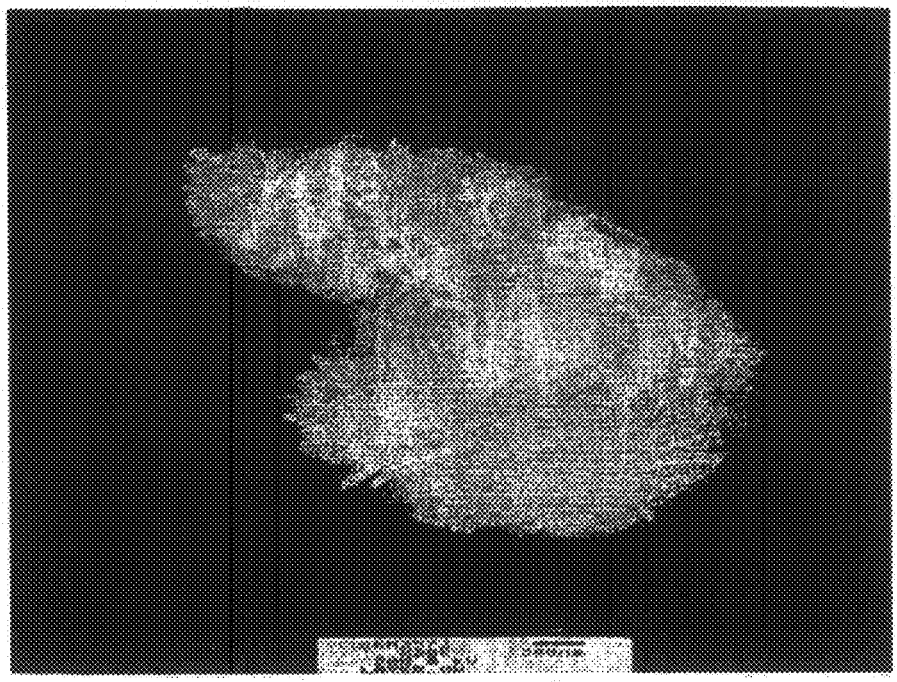
[Fig. 15]
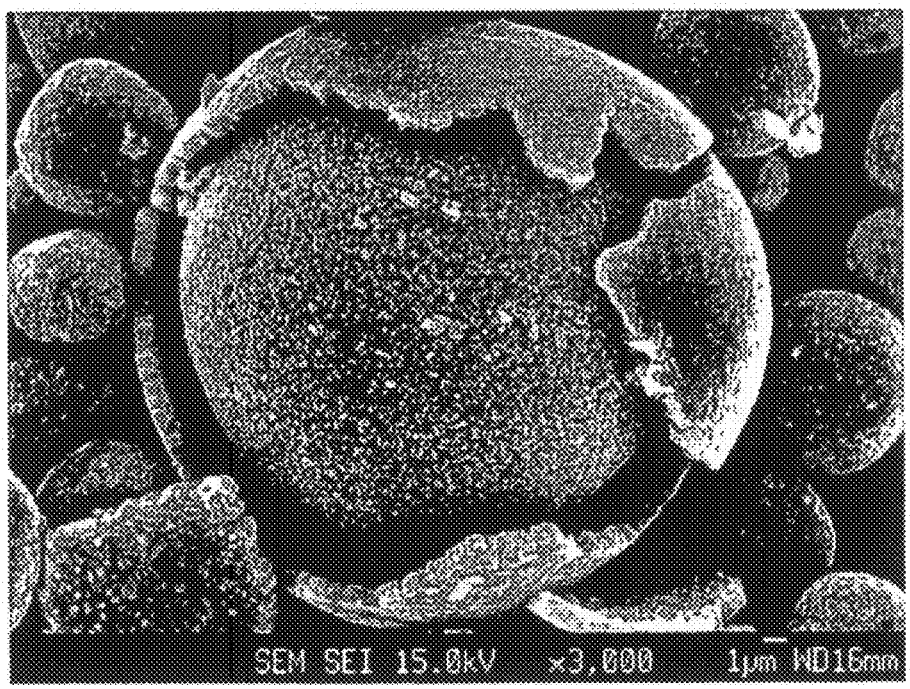

[Fig. 16]
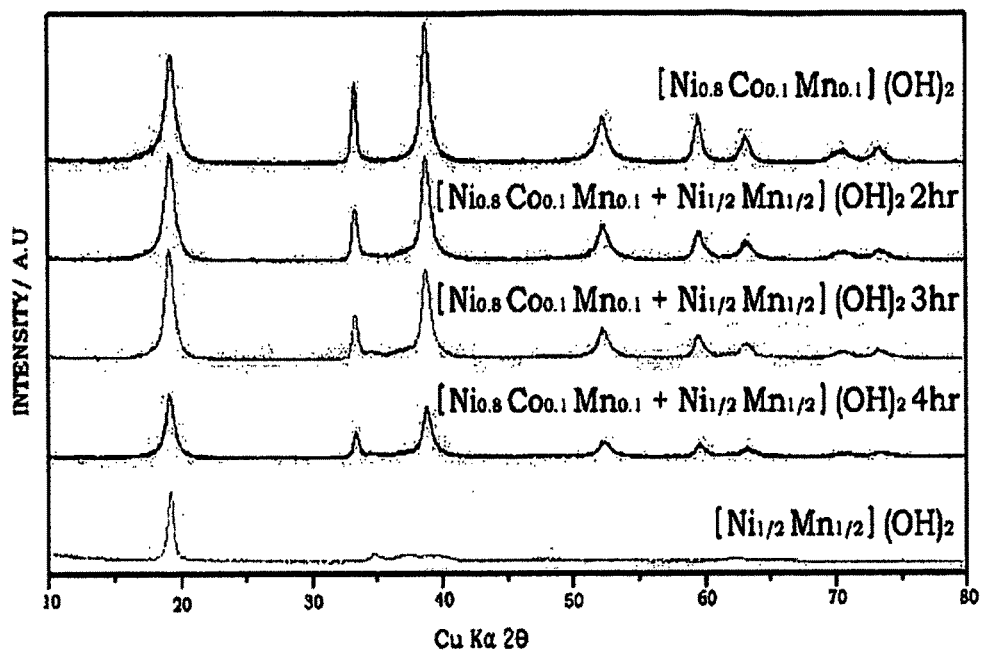
[Fig. 17]
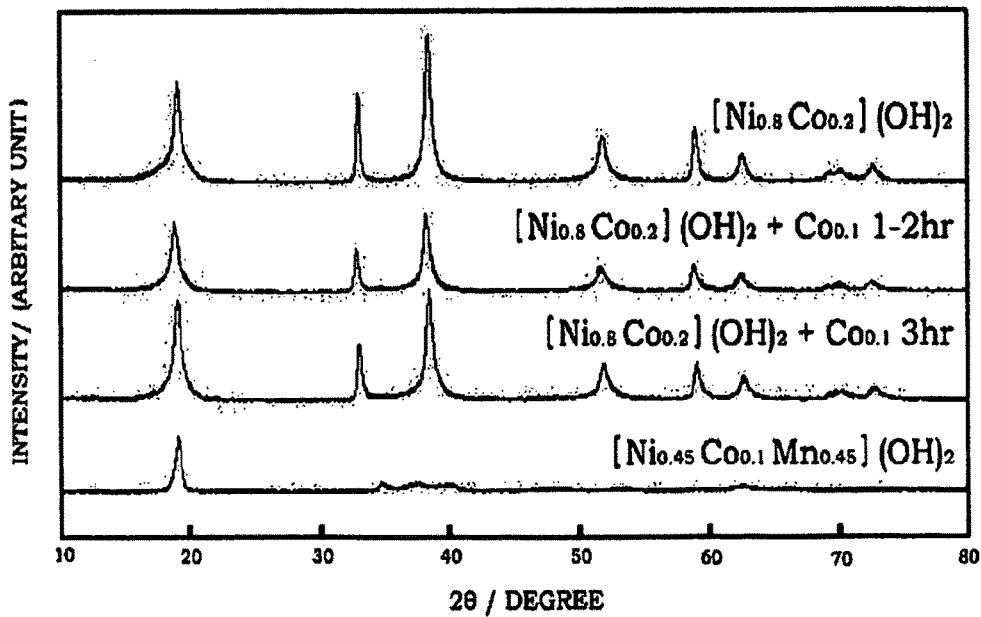

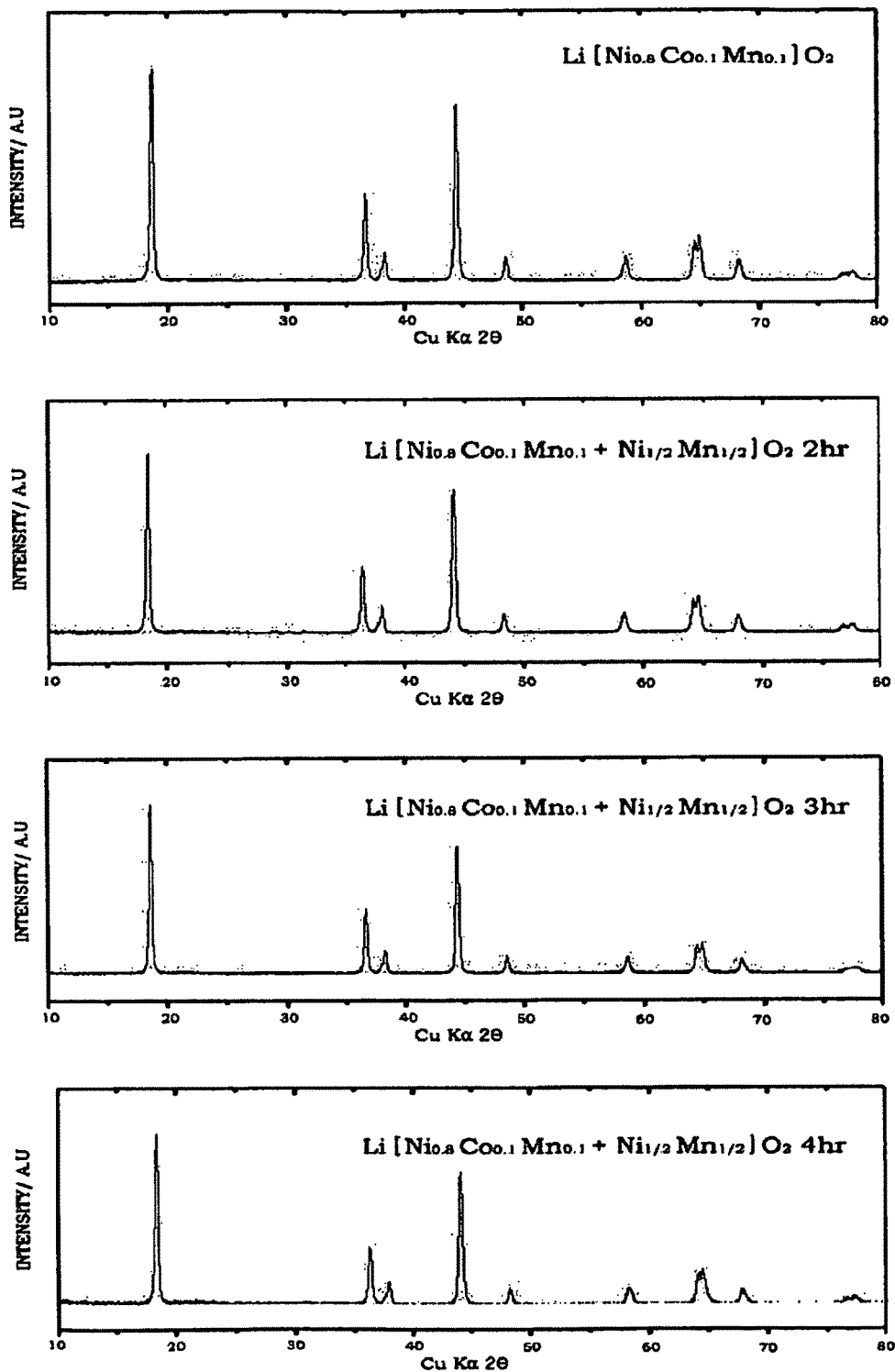
[Fig. 18]

[Fig. 19]
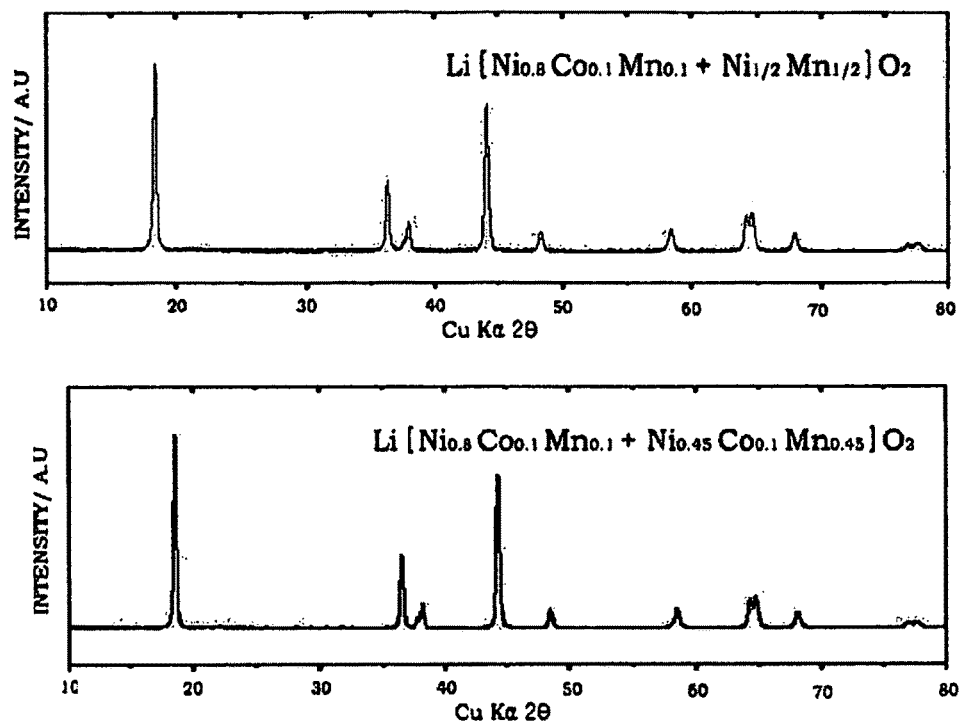
[Fig. 20]
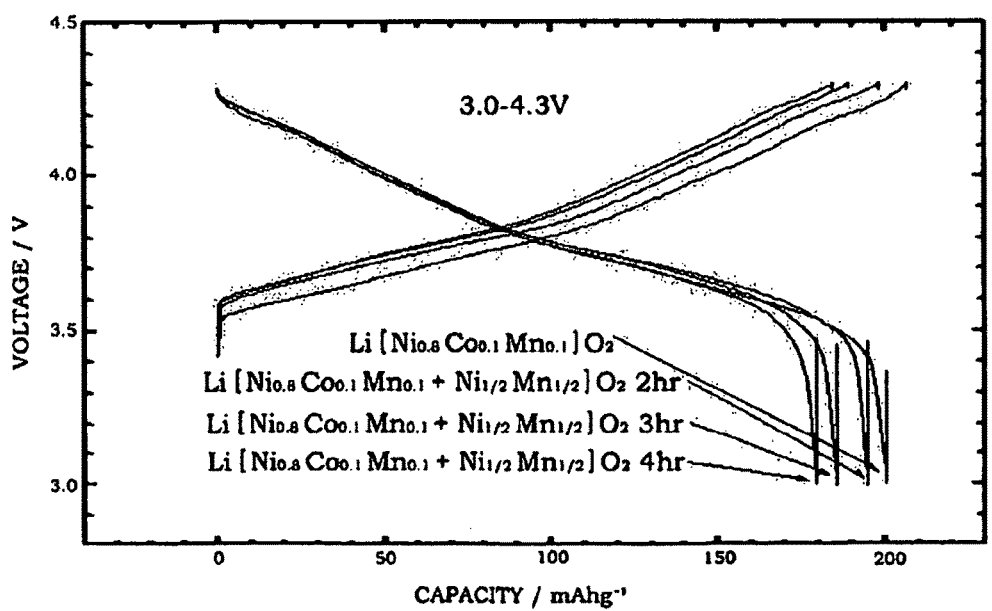

[Fig. 21]
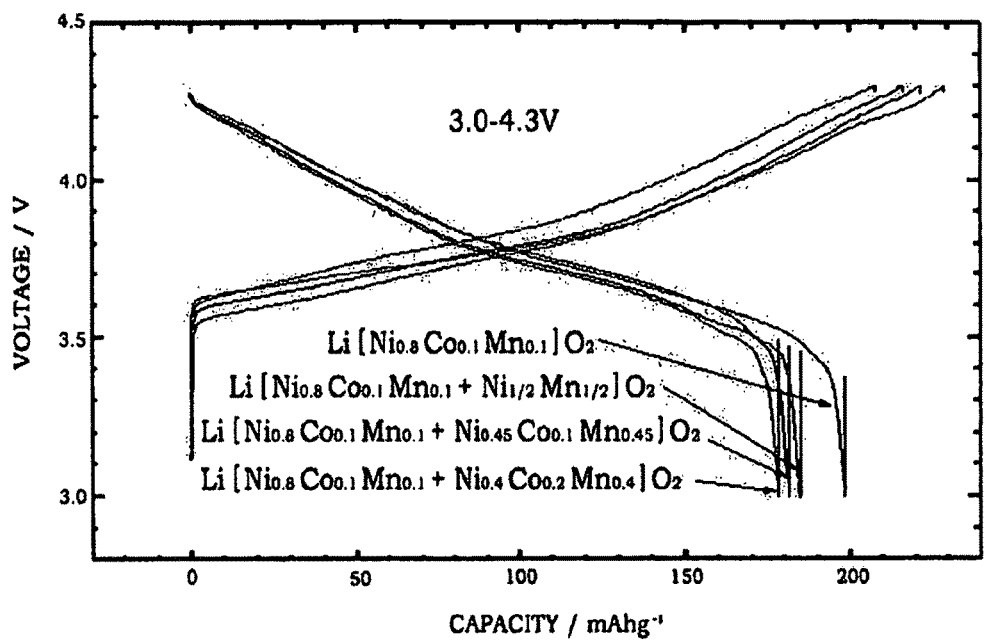
[Fig. 22]
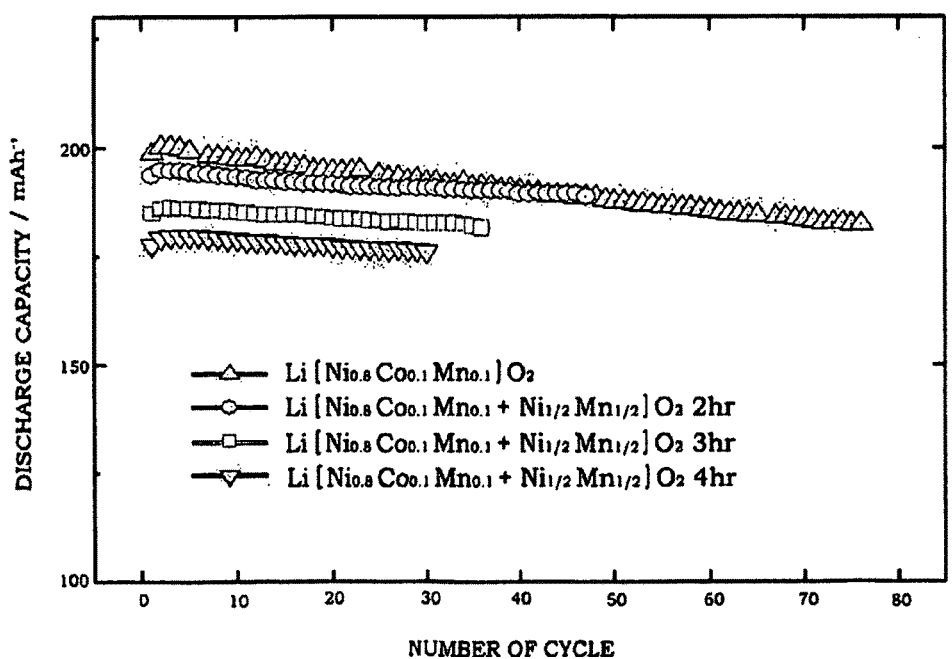

[Fig. 23]
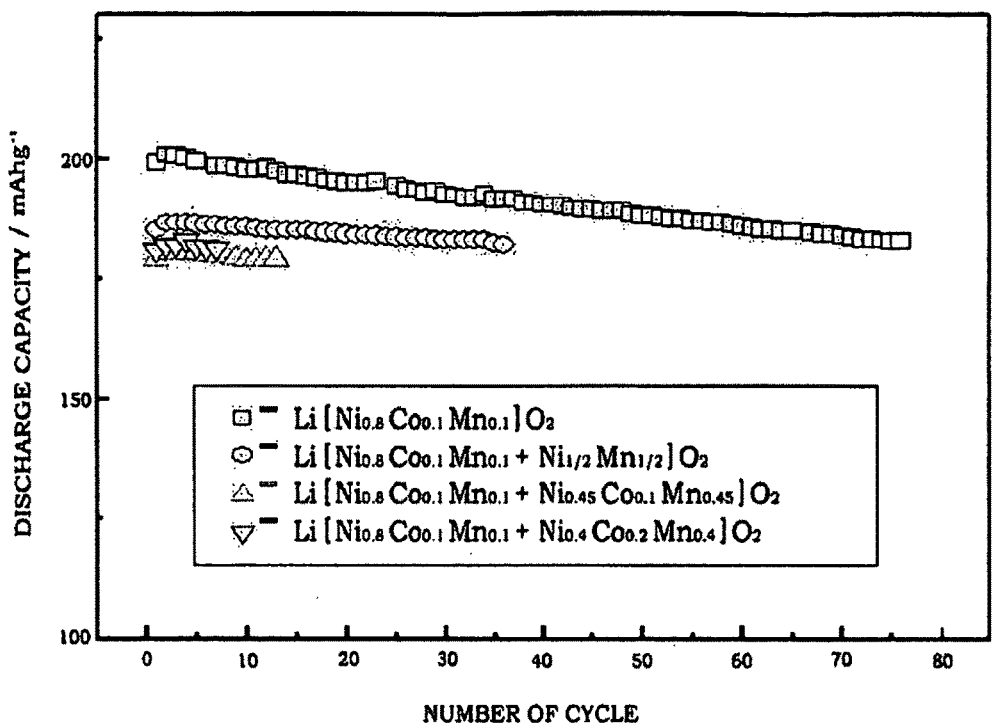
[Fig. 24]
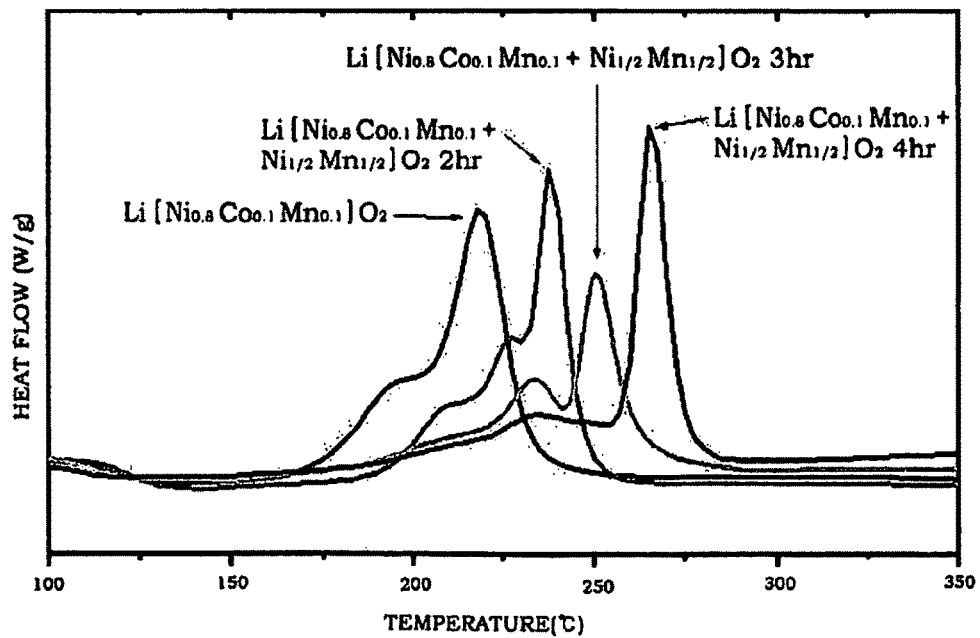

[Fig. 25]
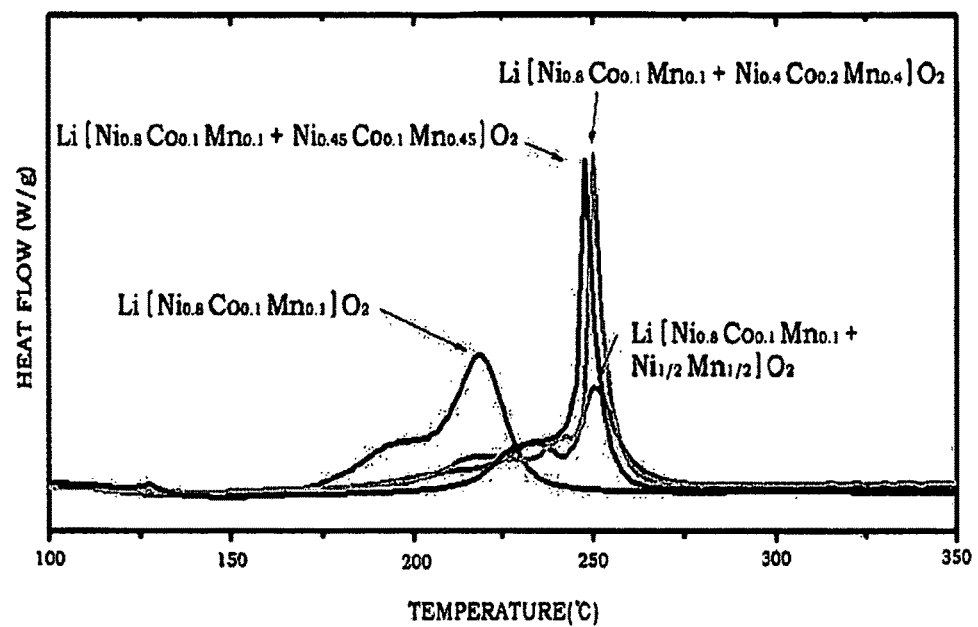
[Fig. 26]
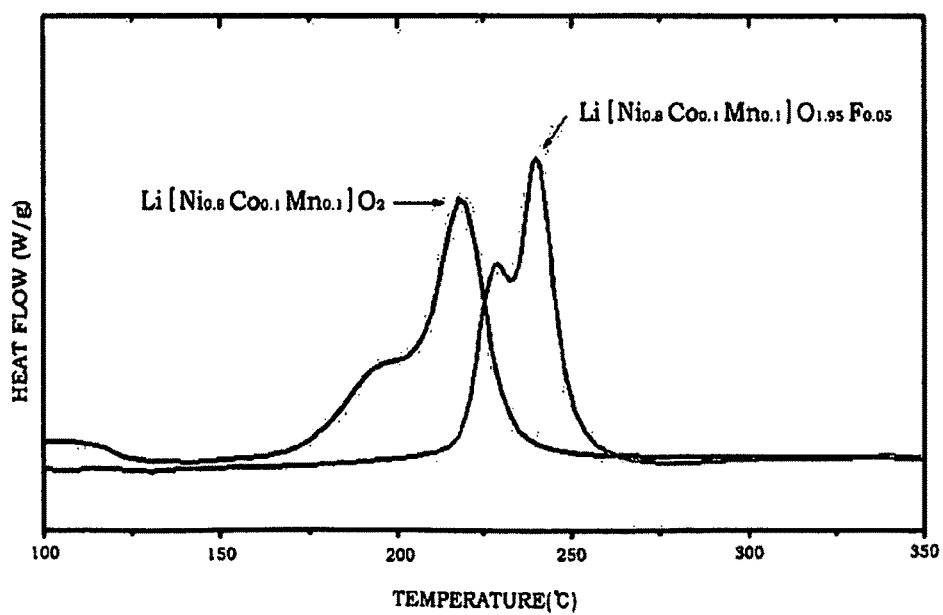

[Fig. 27]
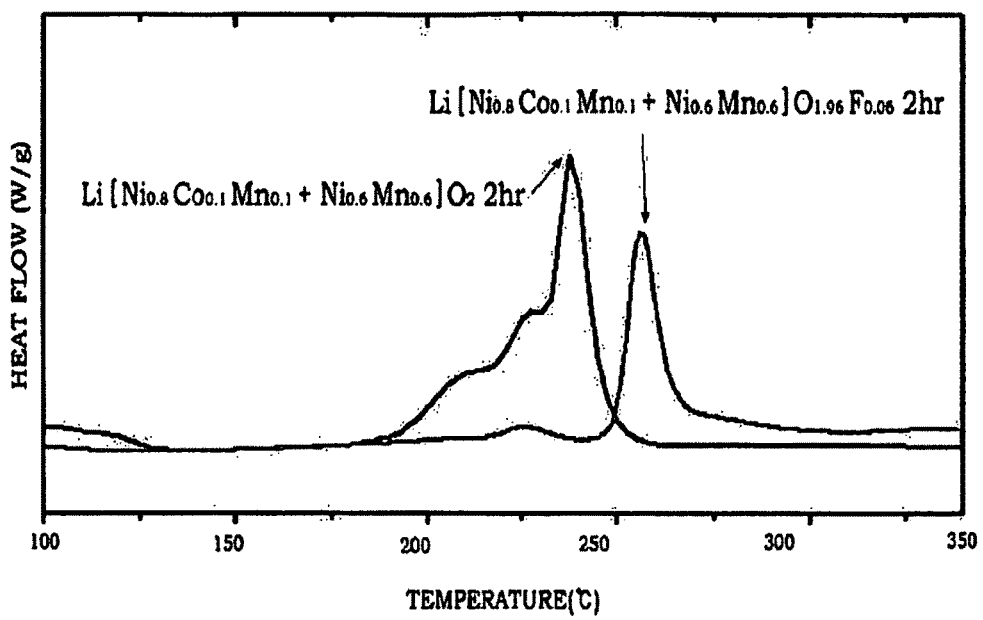
[Fig. 28]
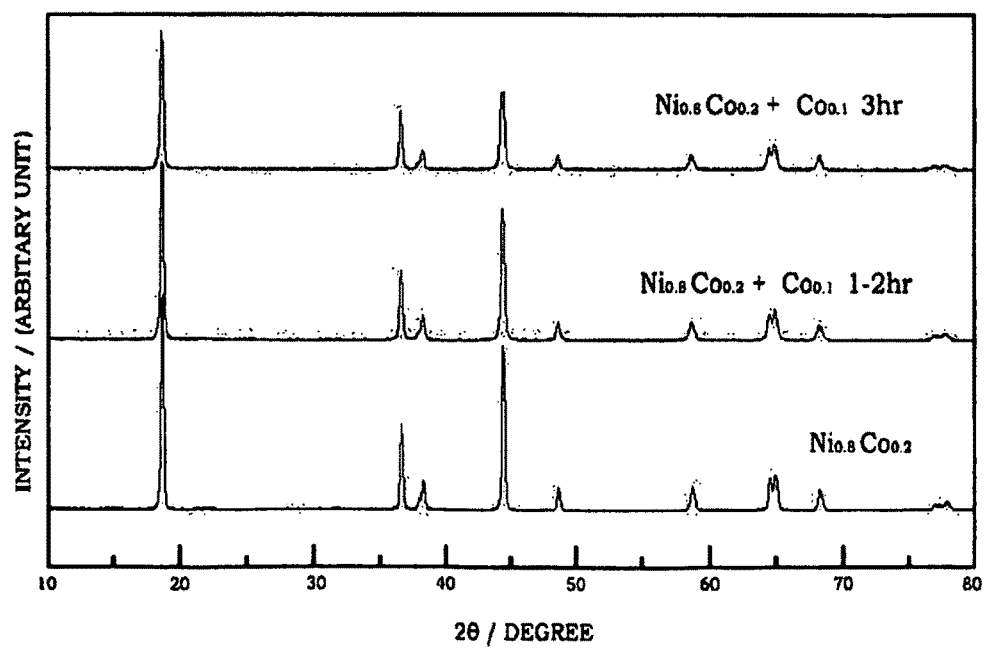

[Fig. 29]
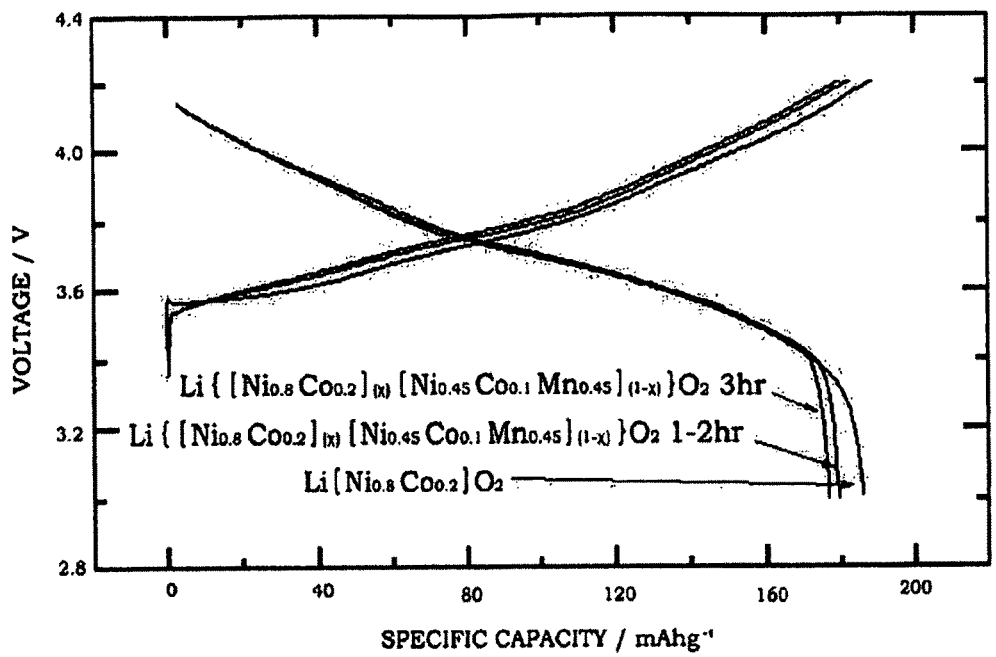
[Fig. 30]
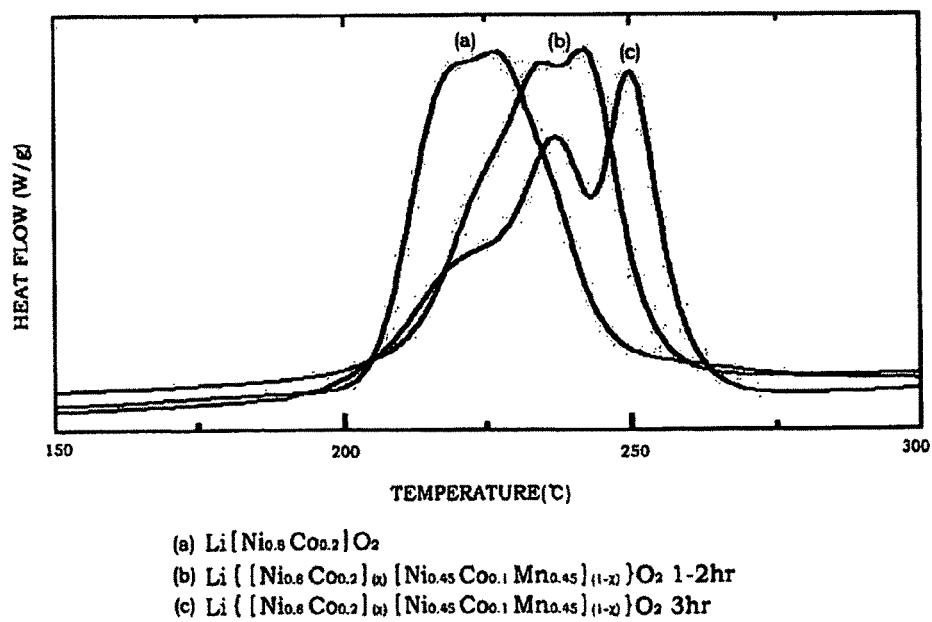
(a) Li[Ni$_{0.8}$Co$_{0.2}$]O$_2$
(b) Li{[Ni$_{0.8}$Co$_{0.2}$]$_{(x)}$[Ni$_{0.45}$Co$_{0.1}$Mn$_{0.45}$]$_{(1-x)}$}O$_2$ 1-2hr
(c) Li{[Ni$_{0.8}$Co$_{0.2}$]$_{(x)}$[Ni$_{0.45}$Co$_{0.1}$Mn$_{0.45}$]$_{(1-x)}$}O$_2$ 3hr

DOUBLE-LAYER CATHODE ACTIVE MATERIALS FOR LITHIUM SECONDARY BATTERIES, METHOD FOR PREPARING THE ACTIVE MATERIALS, AND LITHIUM SECONDARY BATTERIES USING THE ACTIVE MATERIALS

TECHNICAL FIELD

The present invention relates to double-layer cathode active materials for lithium secondary batteries and a method for preparing the active materials. More particularly, the present invention relates to double-layer cathode active materials with high capacity, high charge density, improved cycle characteristics and superior thermal safety which comprise a nickel-based cathode active material having high-capacity characteristics as an inner layer material and a transition metal mixture-based cathode active material having superior safety characteristics as an outer layer material, and a method for preparing the active materials.

BACKGROUND ART

Lithium ion secondary batteries are small, lightweight and high-capacity batteries. Since lithium ion secondary batteries were developed in 1991, they have been widely used as electric sources of portable devices. With the recent remarkable progress of electronic, communication and computer technologies, devices, such as camcorders, cell phones and notebooks, have been introduced into the market and there has been increased demand for lithium ion secondary batteries as power sources for driving the portable digital communication devices.

In particular, a number of studies on power sources for electric vehicles in which an internal-combustion engine is hybridized with a lithium secondary battery have been actively undertaken in the United States, Japan, Europe and other countries. Lithium ion secondary batteries have been considered for use as large-size batteries for electric vehicles, due to their energy density, but are still undergoing development. Particularly, nickel-hydrogen batteries are preferred in terms of safety. The most urgent tasks associated with the use of lithium ion secondary batteries are high price and poor safety.

In particular, cathode active materials, such as $LiCoO_2$ and $LiNiO_2$, generally used at present, have the drawbacks that they do not have a stable crystal structure due to lithium deintercalation during charging, causing poor thermal characteristics.

That is, when an overcharged battery is heated to 200~270° C., a rapid change in the structure of the battery takes place, which induces a reaction releasing oxygen present in the lattice (J. R. Dahn et al., Solid State Ionics, 69, 265 (1994)).

Commercially available small-size lithium ion secondary batteries use $LiCoO_2$ as a cathode material and carbon as an anode material. $LiCoO_2$ is superior in terms of stable charge-discharge characteristics, high electronic conductivity, superior stability and plateau discharge voltage characteristics, but is disadvantageous in terms of insufficient cobalt deposits, high price and human toxicity. For these reasons, development of novel cathode materials is needed.

$LiNiO_2$, which has a layered structure like $LiCoO_2$, has a high discharge capacity, but is difficult to form into a pure layered structure. Further, since $LiNiO_2$ is transformed into $Li_xNi_{1-x}O$ having a rocksalt-type structure due to the presence of highly reactive $Ni^{4+}$ ions after discharge while releasing a large quantity of oxygen, it has some problems of short life and poor thermal stability. Accordingly, $LiNiO_2$ is currently limited in commercial applications.

To solve these problems, there have been attempts to shift the temperature at which heat emission is initiated to a slightly higher temperature by replacing a part of nickel atoms in $LiNiO_2$ with transition metal elements, or to broaden the exothermic peaks for the purpose of preventing sudden heat emission (T. Ohzuku et al., J. Electrochem. Soc., 142, 4033 (1995), Japanese Patent Laid-open No. Hei 9-237631). However, satisfactory results could not be achieved.

Further, $LiNi_{1-x}Co_xO_2$ (x=0.1~0.3) wherein a part of nickel atoms in $LiNiO_2$ are replaced with cobalt atoms shows superior charge-discharge characteristics and cycle characteristics, but fails to solve the problem of poor thermal safety.

Much is known regarding the compositions and preparation processes of Li—Ni—Mn-based composite oxides in which a part of Ni atoms are replaced with thermally safe Mn atoms and Li—Ni—Mn—Co-based composite oxides in which a part of Ni atoms are replaced with Mn and Co atoms.

For example, Japanese Patent Laid-open No. Hei 8-171910 discloses a method for preparing $LiNi_xMn_{1-x}O_2$ (0.7=x=0.95) as a cathode active material by mixing an alkali solution with a mixed aqueous solution of Mn and Ni to co-precipitate the Mn and Ni, mixing the co-precipitated compound with lithium hydroxide, and calcining the mixture.

Further, Japanese Patent Laid-open No. 2000-227858 suggests a method for preparing a cathode active material based on the new concept that Mn and Ni compounds are uniformly dispersed on the atomic level to form a solid solution, rather than the concept that $LiNiO_2$ or $LiMnO_2$ is partly replaced with transition metals.

However, $LiNi_{1-x}Co_xMn_yO_2$ (0<y≤0.3) disclosed in European Patent No. 0918041 and U.S. Pat. No. 6,040,090 shows improved thermal stability as compared to conventional materials composed of Ni and Co only, but it has difficulties in commercialization due to the reactivity of $Ni^{4+}$.

Further, $Li_aCo_bMn_cMdNi_{1-(b+c+d)}O_2$(M=B, Al, Si. Fe, Cr, Cu, Zn, W, Ti or Ga) wherein Co, Mn and other metals are used in place of Ni is described in European Patent No. 0872450 A1 and B1. However, this material still has the problem of poor thermal safety.

DISCLOSURE OF INVENTION

Technical Problem

Therefore, the present invention has been made in view of the above problems of the prior art, and it is an object of the present invention to provide double-layer cathode active materials with high capacity, high charge density, improved cycle characteristics and superior thermal safety which comprise a nickel-based cathode active material having high-capacity characteristics as an inner layer material and a nickel-manganese-cobalt-based cathode (hereinafter, referred to as a 'transition metal mixture-based cathode') active material having superior safety characteristics as an outer layer material facing an electrolyte.

It is another object of the present invention to provide a method for preparing the double-layer cathode active materials by hydroxide co-precipitation.

It is yet another object of the present invention to provide lithium secondary batteries using the double-layer cathode active materials.

Technical Solution

In accordance with one aspect of the present invention for achieving the above objects, there is provided a double-layer cathode active material for a lithium secondary battery comprising a nickel-based cathode active material as an inner layer material and a transition metal mixture-based cathode active material as an outer layer material facing an electrolyte.

The double-layer cathode active material of the present invention is characterized in that the inner layer material is $Li_{1+\delta}[Co_aMn_bM_cNi_{1-(a+b+c)}]O_2$ (M is at least one element selected from the group consisting of Mg, Zn, Ca, Sr, Cu, Zr, P, Fe, Al, Ga, In, Cr, Ge and Sn, $0 \leq \delta \leq 1/5$, $0 \leq a \leq 0.5$, $0 \leq b \leq 0.2$, $0 \leq c \leq 0.1$, and $0 \leq a+b+c \leq 0.5$).

The double-layer cathode active material of the present invention is characterized in that the outer layer material is $Li_{1+\delta}[Ni_xMn_{x-y/2}Co_{1-2x-z}M_yN_z]O_{2-a}P_a$ or $Li_{1+\delta}[Ni_xMn_{x+y}Co_{1-2(x+y)}My]O_{2-a}P_a$ (M is at least one element selected from the group consisting of Mg, Zn, Ca, Sr, Cu and Zr, N is at least one element selected from the group consisting of Fe, Al, Ga, In, Cr, Ge and Sn, P is F or S, $0 \leq \delta \leq 1/5$, $0 \leq x \leq 1$, $0 \leq y \leq 1/10$, $0 \leq z \leq 1/10$, and $0 \leq a \leq 0.3$).

In the $Li_{1+\delta}[Co_aMn_bM_cNi_{1-(a+b+c)}]O_2$, the oxidation number of Co, Mn and Ni is +3, and that of M composed of at least one element is +2, +3, +4, +5 or +6.

In the $Li_{1+\delta}[Ni_xMn_{x-y/2}Co_{1-2x-z}M_yN_z]O_{2-a}P_a$ or $Li_{1+\delta}[Ni_xMn_{x+y}Co_{1-2(x+y)}My]O_{2-a}P_a$, the oxidation number of Ni is +2, that of Mn is +4, that of Co is +3, that of the substituted metal salt M is +2, and that of the substituted metal N is +3.

The thickness of the $Li_{1+\delta}[Ni_xMn_{x-y/2}Co_{1-2x-z}M_yN_z]O_{2-a}P_a$ or $Li_{1+\delta}[Ni_xMn_{x+y}Co_{1-2(x+y)}My]O_{2-a}P_a$ is 50% or lower, relative to the total thickness of the double-layer cathode active material.

The average particle diameter of the nickel-based cathode active material is 0.1 to 2 □, and that of the double-layer cathode active material is 5 to 20 □.

In accordance with another aspect of the present invention, there is provided a method for preparing the double-layer cathode active material for a lithium secondary battery, comprising the steps of: simultaneously mixing a nickel-based metal precursor, an aqueous ammonia solution and a basic solution in a reactor to obtain a spherical precipitate (step 1); simultaneously adding a transition metal mixture-based metal precursor, an aqueous ammonia solution and a basic solution to the precipitate, followed by mixing, to obtain a precipitate of a double-layer composite metal hydroxide encapsulated with a transition metal hydroxide (step 2); drying or heating the precipitate obtained in step 2 to obtain a double-layer composite metal hydroxide/oxide (step 3); and mixing the double-layer composite metal hydroxide/oxide with a lithium precursor to obtain a double-layer lithium composite metal oxide.

In step 1, an aqueous solution containing at least two metal salts is used as the precursor. The molar ratio of the ammonia to the metal salts is between 0.2:1 and 0.4:1. The pH of the reaction solution is adjusted to 10.5~12, and the reaction is carried out for 2~10 hours.

In step 2, the reaction time is controlled to 1~10 hours to regulate the thickness of the outer layer.

In step 3, the drying is carried out at 110° C. for 15 hours or the heating is carried out at 400~550° C. for 5~10 hours.

Step 3 includes the sub-steps of pre-calcining at 400~650° C. for 5 hours, calcining at 700~1,100° C. for 10 hours, and annealing at 700° C. for 10 hours.

In step 4, the dried composite metal hydroxide/oxide and the lithium precursor are mixed in an aqueous solution containing a chelating agent, such as citric acid, tartaric acid, glycolic acid, maleic acid, etc., and then the distilled water is removed.

In accordance with yet another aspect of the present invention, there is provided a lithium secondary battery using the double-layer cathode active material.

Advantageous Effects

The cathode active material with both a layered rocksalt-type structure and a double-layer structure prepared by hydroxide co-precipitation comprises a nickel-based cathode active material having high-capacity characteristics as an inner layer material and a transition metal mixture-based cathode active material having superior thermal safety as an outer layer material facing an electrolyte. Therefore, the cathode active material of the present invention shows high capacity, high charge density, improved cycle characteristics, and superior thermal safety.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view showing the structure of a reactor used in a method for preparing cathode active materials according to the present invention;

FIG. 2 is a photograph of a composite oxide powder obtained after $(Ni_{0.8}Co_{0.1}Mn_{0.1})(OH)_2$ is dried in a hot-air dryer at 110° C. for 12 hours, FIG. 5 is a photograph of a powder obtained after $(Ni_{0.8}Co_{0.1}Mn_{0.1})(OH)_2$ is encapsulated with $(Ni_{0.5}Mn_{0.5})(OH)_2$ for 4 hours, FIG. 6 is a photograph of a $(Ni_{0.8}Co_{0.2})(OH)_2$ powder, FIG. 7 is a photograph of a powder obtained after $(Ni_{0.8}Co_{0.2})(OH)_2$ is encapsulated with $(Ni_{0.45}Co_{0.1}Mn_{0.45})(OH)_2$ for 1~2 hours, and FIG. 8 is a photograph of a powder obtained after $(Ni_{0.8}Co_{0.2})(OH)_2$ is encapsulated with $(Ni_{0.45}Co_{0.1}Mn_{0.45})(OH)_2$ for 3 hours;

FIG. 9 shows field emission-scanning electron microscopy (FE-SEM) images of precursor powders $(Ni_{0.8}Co_{0.1}Mn_{0.1})(OH)_2$ and $\{(Ni_{0.8}Co_{0.1}Mn_{0.1})_x(Ni_{1/2}Mn_{1/2})_{1-x}\}(OH)_2$ with encapsulation time: (1) a powder before formation of a double layer, (2) 2 hours after encapsulation reaction, (3) 3 hours after encapsulation reaction, (4) 4 hours after encapsulation reaction, FIGS. 10 and 11 are FE-SEM images of precursor powders $\{(Ni_{0.8}Co_{0.1}Mn_{0.1})_x(Ni_{0.45}Co_{0.1}Mn_{0.45})_{1-x}\}(OH)_2$ and $\{(Ni_{0.8}Co_{0.1}Mn_{0.1})_x(Ni_{0.4}Co_{0.2}Mn_{0.4})_{1-x}\}(OH)_2$ with different Co contents, respectively, and FIG. 12 shows FE-SEM images of $(Ni_{0.8}Co_{0.2})(OH)_2$ and a precursor powder $(Ni_{0.8}Co_{0.2})_x(Ni_{0.45}Co_{0.1}Mn_{0.45})_{1-x}(OH)_2$ with an encapsulation time of 3 hours;

FIG. 13 shows energy dispersive X-ray spectra (EDX) of a powder obtained after $(Ni_{0.8}Co_{0.1}Mn_{0.1})(OH)_2$ is encapsulated with $(Ni_{0.5}Mn_{0.5})(OH)_2$ for 4 hours: (a) MnKα (b) CoKα and (c) NiKα

FIG. 14 is a transmission electron microscope (TEM) image of a powder obtained after $(Ni_{0.8}Co_{0.1}Mn_{0.1})(OH)_2$ is encapsulated with $(Ni_{0.5}Mn_{0.5})(OH)_2$;

FIG. 15 is an FE-SEM image of a ground powder of $Li[(Ni_{0.8}Co_{0.1}Mn_{0.1})_x(Ni_{1/2}Mn_{1/2})_{1-x}]O_2$ as a cathode active material;

FIG. 16 shows X-ray diffraction patterns of precursor powders of $(Ni_{0.8}Co_{0.1}Mn_{0.1})(OH)_2$, $(Ni_{1/2}Mn_{1/2})(OH)_2$ and double-layers of $\{(Ni_{0.8}Co_{0.1}Mn_{0.1})_x(Ni_{1/2}Mn_{1/2})_{1-x}\}(OH)_2$ with different encapsulation time, and FIG. 17 shows X-ray diffraction patterns of precursor powders of $(Ni_{0.8}Co_{0.2})(OH)_2$, $(Ni_{0.45}Co_{0.1}Mn_{0.45})_{1-x}\}(OH)_2$ and double-layers of $\{(Ni_{0.8}Co_{0.2})_x(Ni_{0.45}Co_{0.1}Mn_{0.45})_{1-x}\}(OH)_2$ with different encapsulation time;

FIG. 18 shows X-ray diffraction patterns of $Li[Ni_{0.8}Co_{0.1}Mn_{0.1}]O_2$ and double-layer powders of $Li\{(Ni_{0.8}Co_{0.1}Mn_{0.1})_x(Ni_{1/2}Mn_{1/2})_{1-x}\}O_2$ with encapsulation time, and FIG. 19 shows X-ray diffraction patterns of double-layer powders of $Li\{(Ni_{0.8}Co_{0.1}Mn_{0.1})_x(Ni_{1/2}Mn_{1/2})_{1-x}\}O_2$ and $Li[(Ni_{0.8}Co_{0.1}Mn_{0.1})_x(Ni_{0.45}Co_{0.1}Mn_{0.45})_{1-x}]O_2$ with an encapsulation time of 3 hours;

FIG. 20 shows charge-discharge curves of powders $Li[Ni_{0.8}Co_{0.1}Mn_{0.1}]O_2$ and $Li\{(Ni_{0.8}Co_{0.1}Mn_{0.1})_x(Ni_{1/2}Mn_{1/2})_{1-x}\}O_2$ with different encapsulation time in the voltage range of 3.0~4.3V and a constant current of 0.4 mA, and FIG. 21 shows charge-discharge curves of $Li[(Ni_{0.8}Co_{0.1}Mn_{0.1})]O_2$, and double-layer powders $Li\{(Ni_{0.8}Co_{0.1}Mn_{0.1})_x(Ni_{1/2}Mn_{1/2})_{1-x}\}O_2$, $Li[(Ni_{0.8}Co_{0.1}Mn_{0.1})_x(Ni_{0.45}Co_{0.1}Mn_{0.45})_{1-x}]O_2$, and $Li[(Ni_{0.8}Co_{0.1}Mn_{0.1})_x(Ni_{0.4}Co_{0.2}Mn_{0.4})_{1-x}]O_2$ with an encapsulation time of 3 hours in the voltage range of 3.0~4.3V and a constant current of 0.4 mA;

FIG. 22 shows cycling behavior of $Li[Ni_{0.8}Co_{0.1}Mn_{0.1}]O_2$ and double-layer $Li\{(Ni_{0.8}Co_{0.1}Mn_{0.1})_x(Ni_{1/2}Mn_{1/2})_{1-x}\}O_2$ with different encapsulation time in the voltage range of 3.0~4.3V and a constant current of 0.4 mA, and FIG. 23 shows cycling behavior of $Li[Ni_{0.8}Co_{0.1}Mn_{0.1}]O_2$ and double-layers $Li\{(Ni_{0.8}Co_{0.1}Mn_{0.1})_x(Ni_{1/2}Mn_{1/2})_{1-x}\}O_2$, $Li[(Ni_{0.8}Co_{0.1}Mn_{0.1})_x(Ni_{0.45}Co_{0.1}Mn_{0.45})_{1-x}]O_2$, and $Li[(Ni_{0.8}Co_{0.1}Mn_{0.1})_x(Ni_{0.4}Co_{0.2}Mn_{0.4})_{1-x}]O_2$ with an encapsulation time of 3 hours in the voltage range of 3.0~4.3V and a constant current of 0.4 mA;

FIG. 24 shows differential scanning calorimetry (DSC) of $Li[Ni_{0.8}Co_{0.1}Mn_{0.1}]O_2$ and double-layer $Li\{(Ni_{0.8}Co_{0.1}Mn_{0.1})_x(Ni_{1/2}Mn_{1/2})_{1-x}\}O_2$ with encapsulation time charged to 4.3 V, and FIG. 25 shows differential scanning calorimetry (DSC) of $Li[Ni_{0.8}Co_{0.1}Mn_{0.1}]O_2$ and double-layers $Li\{(Ni_{0.1}Co_{0.1}Mn_{0.1})_x(Ni_{1/2}Mn_{1/2})_{1-x}\}O_2$, $Li[(Ni_{0.8}Co_{0.1}Mn_{0.1})_x(Ni_{0.45}Co_{0.1}Mn_{0.45})_{1-x}]O_2$, and $Li[(Ni_{0.8}Co_{0.1}Mn_{0.1})_x(Ni_{0.4}Co_{0.2}Mn_{0.4})_{1-x}]O_2$ with an encapsulation time of 3 hours charged to 4.3 V;

FIG. 26 shows differential scanning calorimetry (DSC) of $Li[(Ni_{0.8}Co_{0.1}Mn_{0.1})]O_2$ and $Li[(Ni_{0.8}Co_{0.1}Mn_{0.1})]O_{1.95}F_{0.05}$ powders charged to 4.3V;

FIG. 27 shows differential scanning calorimetry (DSC) of double-layers $Li\{(Ni_{0.8}Co_{0.1}Mn_{0.1})_x(Ni_{1/2}Mn_{1/2})_{1-x}\}O_2$ and $Li\{(Ni_{0.8}Co_{0.1}Mn_{0.1})_x(Ni_{1/2}Mn_{1/2})_{1-x}\}O_{1.95}F_{0.05}$ charged to 4.3V;

FIG. 28 shows X-ray diffraction patterns of double-layers $Li[Ni_{0.8}Co_{0.2}]O_2$ and $Li\{(Ni_{0.8}Co_{0.2})_x(Ni_{0.45}Co_{0.1}Mn_{0.45})_{1-x}\}O_2$ with different encapsulation time;

FIG. 29 shows charge-discharge curves of $Li[Ni_{0.8}Co_{0.2}]O_2$ and double-layer $Li[(Ni_{0.8}Co_{0.2})_x(Ni_{0.45}Co_{0.1}Mn_{0.45})_{1-x}]O_2$ with encapsulation time in the voltage range of 3.0~4.3V and a constant current of 0.4 mA; and FIG. 30 shows differential scanning calorimetry (DSC) of $Li[(Ni_{0.8}Co_{0.2})]O_2$ and double-layer powder $Li(Ni_{0.8}Co_{0.2})_x(Ni_{0.45}Co_{0.1}Mn_{0.45})_{1-x}]O_2$ with different encapsulation time charged to 4.2V.

BEST MODE FOR CARRYING OUT THE INVENTION

Figure 3:
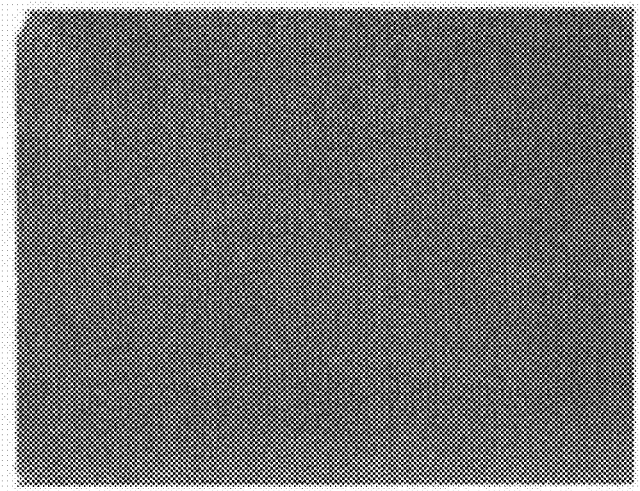
FIG. 3 is a photograph of a powder obtained after $(Ni_{0.8}Co_{0.1}Mn_{0.1})(OH)_2$ is encapsulated with $(Ni_{0.5}Mn_{0.5})(OH)_2$ for 1~2 hours.

A method for preparing a double-layer cathode active material for a lithium secondary battery according to the present invention will now be described in detail.

The method of the present invention comprises the steps of: simultaneously mixing a nickel-based metal precursor, an aqueous ammonia solution and a basic solution in a reactor to obtain a spherical precipitate (step 1); simultaneously adding a transition metal mixture-based metal precursor, an aqueous ammonia solution and a basic solution to the precipitate, followed by mixing, to obtain a precipitate of a double-layer composite metal hydroxide encapsulated with a transition metal hydroxide (step 2); drying or heating the precipitate obtained in step 2 to obtain a double-layer composite metal hydroxide/oxide (step 3); and mixing the double-layer composite metal hydroxide/oxide with a lithium precursor to obtain a double-layer lithium composite metal oxide.

The cathode active material for a lithium secondary battery prepared by the method of the present invention comprises $Li_{1+\delta}[Co_aMn_bM_cNi_{1-(a+b+c)}]O_2$ (M is at least one element selected from the group consisting of Mg, Zn, Ca, Sr, Cu, Zr, P, Fe, Al, Ga, In, Cr, Ge and Sn, $0 \leq \delta \leq 1/5$, $0 \leq a \leq 0.5$, $0 \leq b \leq 0.2$, $0 \leq c \leq 0.1$, and $0 \leq a+b+c \leq 0.5$) as an inner layer material and $Li_{1+\delta}[Ni_xMn_{x-y/2}Co_{1-2x-z}M_yN_z]O_{2-a}P_a$ or $Li_{1+\delta}[Ni_xMn_{x+y}Co_{1-2(x+y)}My]O_{2-a}P_a$ (M is at least one selected from the group consisting of Mg, Zn, Ca, Sr, Cu and Zr, N is at least one element selected from the group consisting of Fe, Al, Ga, In, Cr, Ge and Sn, P is F or S, $0 \leq \delta \leq 1/5$, $0 \leq x \leq 1$, $0 \leq y \leq 1/10$, $0 \leq z \leq 1/10$, and $0 \leq a \leq 0.3$) as an outer layer material. In addition, the cathode active material for a lithium secondary battery has both a layered rocksalt-type structure and a double-layer structure. A general layered cathode active material wherein oxygen (O) is partly replaced with F has greatly improved high-rate characteristics and cycle characteristics (Korean Patent Application No. 10-2004-0021269).

The amount of F contained in the outer transition metal mixture-based cathode active material is preferably 0.06 moles or smaller, with respect to 1 mole of O. If the amount of F is too small, improvement in cycle and thermal safety characteristics is not achieved. On the other hand, if the amount of F is too large, the reversible capacity is decreased and the discharge characteristics drop.

FIG. 1 shows the structure of a reactor used in the method according to the present invention. As shown in FIG. 1, the reactor has reverse-type rotating blades and at least one baffle spaced about 2~3 cm apart from the inner wall of the reactor.

The reverse-type design of the rotating blades allows uniform mixing of a reaction solution at the upper and lower portions of the reactor, and the spacing of the baffle from the inner wall of the reactor enables control of the flow rate and concentration of the reaction solution and enhances the turbulence effects, thus solving local non-uniformity of the reaction solution.

Unlike an ammonia complex method wherein ammonia water is mixed with a metal solution, followed by precipitation, a metal hydroxide method employed to prepare the cathode active material of the present invention is a process wherein an aqueous solution containing two or more metal salts, an aqueous ammonia solution and an aqueous NaOH solution are added to a reactor to prevent initial oxidation of manganese ions, thereby achieving uniformity of particles and obtaining a precipitate in which metal elements are uniformly distributed.

Hereinafter, the metal hydroxide method employed to prepare the cathode active material for a lithium secondary battery having both a layered rocksalt-type structure and a double-layer structure according to the present invention will be explained in detail.

First, Co, Mn, M (M is Mg, Zn, Ca, Sr, Cu, Zr, P, Fe, Al, Ga, In, Cr, Ge or Sn, $0 \leq \delta \leq 1/5$, $0 \leq a \leq 0.5$, $0 \leq b \leq 0.2$, $0 \leq c \leq 0.1$, and $0 \leq a+b+c \leq 0.5$) and Ni are dissolved in a ratio of a:b:c: 1−(a+b+c) in distilled water. The substituted metal salts M are preferably selected from at least two elements. Then, the nickel-based metal precursor, an aqueous ammonia solution and a basic solution are mixed in the reactor.

The aqueous metal solution preferably has a concentration of 0.5M to 3M, the concentration ratio of the aqueous ammonia solution to the aqueous metal solution is preferably between 0.2:1 and 0.4:1, and the aqueous NaOH solution preferably has a concentration of 4M to 5M.

The reason why the concentration ratio between the aqueous ammonia solution and the aqueous metal solution is limited to 0.2~0.4:1 is that ammonia reacts with the metal precursor in a ratio of 1:1 but an intermediate to be formed is returned to ammonia and re-used. Further, the defined range provides optimal conditions for increasing and stabilizing the crystallinity of the final cathode active material.

The aqueous NaOH solution is added to keep the pH of the mixed solution within 10.5~12, and the reaction time is preferably controlled to 2~20 hours.

Specifically, nickel, manganese, cobalt, and substituted metal salts are dissolved in distilled water, and then an aqueous ammonia solution and an aqueous NaOH solution are added thereto to obtain a precipitate. Co-precipitation is a process wherein two or more elements are simultaneously precipitated in an aqueous solution by neutralization to obtain a composite hydroxide.

The average residence time of the mixed solution in the reactor is controlled to 6 hours, the pH is adjusted to 10.5~11.5, and the temperature is maintained at 50~60° C.

The reason why the temperature of the reactor is elevated is that cobalt hydroxide to be formed is precipitated in the form of a complex at low temperatures, making the formation of a high-density composite hydroxide difficult.

After obtaining a precursor hydroxide constituting an inner layer, a metal salt constituting an outer layer is reacted with the precursor hydroxide under the same reaction conditions for 1~10 hours to obtain a double-layer composite hydroxide/oxide. The thickness of the outer layer is regulated by controlling the encapsulation time of a precursor constituting the outer layer in the reactor.

As shown in FIGS. 9 to 12, the average diameter of primary particles formed by the nickel-based cathode active material, which is prepared by co-precipitation, is preferably 0.1~15 □, and that of secondary particles formed by the transition metal mixture-based cathode active material encapsulating the surface of the primary particles is preferably 0.1~20 □.

The control of the average diameter of the primary particles to 0.1~15 □ increases the reactivity during charge and discharge and improves high-rate characteristics of the battery. On the other hand, the control of the average diameter of the secondary particles to 0.1~20 □ increases the chargeability and coatability of the double-layer cathode active material for a lithium secondary battery, thus allowing the electrode to have a high capacity.

To maintain the high-capacity characteristics of the inner layer material $Li_{1+\delta}[Co_aMn_bM_cNi_{1-(a+b+c)}]O_2$ in the double-layer structure, the thickness of the outer layer material $Li_{1+\delta}[Ni_xMn_{x-y/2}Co_{1-2x-z}M_yN_z]O_{2-a}P_a$ or $Li_{1+\delta}[Ni_xMn_{x+y}Co_{1-2(x+y)}My]O_{2-a}P_a$ encapsulating the inner layer material is preferably limited to 50% or less, more preferably 30% or less, and most preferably 10% or lower, relative to the total thickness of the double-layer cathode active material.

When the thickness of the outer layer material $Li_{1+\delta}[Ni_xMn_{x-y/2}Co_{1-2x-z}M_yN_z]O_{2-a}P_a$ or $Li_{1+\delta}[Ni_xMn_{x+y}Co_{1-2(x+y)}My]O_{2-a}P_a$ is 3% or less, the thermal safety drops.

Further, the oxidation number of Ni, Co and Mn is +3 and that of N is +2, +3, +4 or +6 in the inner cathode active material $Li_{1+\delta}[Co_aMn_bM_cNi_{1-(a+b+c)}]O_2$. In contrast, it is preferred that the oxidation number of Ni is +2, that of Mn is +4, that of Co is +3, that of the metal M is +2, and that of N is +3 in the outer cathode active materials $Li_{1+\delta}[Ni_xMn_{x-y/2}Co_{1-2x-z}M_yN_z]O_{2-a}P_a$ and $Li_{1+\delta}[Ni_xMn_{x+y}Co_{1-(x+y)}My]O_{2-a}P_a$.

In particular, the reason why the oxidation number of Mn is +4 is that the structural phase transition (Jahn-Teller effect) induced by the oxidation/reduction of Mn into +3 and +4 in orthorhombic or layered $LiMnO_2$ can be prevented, ensuring the structural stabilization during charge and discharge and thus leading to an improvement in cycle characteristics.

Next, the double-layer composite metal hydroxide/oxide thus obtained is washed with distilled water, filtered, and dried at 110° C. for 15 hours or heat-treated at 450° C. for 5 hours, which is used as a precursor in the subsequent steps.

Thereafter, the double-layer composite metal hydroxide/oxide and a lithium precursor are sufficiently mixed by a dry process, or are mixed in an aqueous solution containing a chelating agent, such as citric acid, tartaric acid, glycolic acid, maleic acid, etc., by a wet process and then the distilled water is removed.

Finally, the lithium composite metal oxide is calcined in an oxidizing atmosphere of air or oxygen at 750~1,000° C. for 10 minutes to 25 hours to prepare the double-layer cathode active material for a lithium secondary battery.

The specific surface area of the double-layer cathode active material thus prepared is preferably 3 $m^2/g$ or smaller. If the specific surface area is greater than 3 $m^2/g$, the reactivity of the cathode active material with an electrolyte is increased, resulting in an increase in the evolution of gasses.

The use of the reactor improves the tap density of the hydroxide by about 10% or more, compared to the use of conventional reactors. The tap density of the hydroxide is 1.95 $g/cm^3$, preferably 2.1 $g/cm^3$ or more, and more preferably 2.4 $g/cm^3$.

Examples of suitable electrolytes that can be used in a lithium secondary battery using the double-layer cathode active material prepared by the method of the present invention include, for example, esters: cyclic carbonates, e.g., ethylene carbonate (EC), propylene carbonate (PC), butylene carbonate (BC) and vinylene carbonate (VC); acyclic carbonates, e.g., dimethyl carbonate (DMC), diethyl carbonate (DEC), ethyl methyl carbonate (EMC) and dipropyl carbonate (DPC); aliphatic carboxylic acid esters, e.g., methyl formate (MF), methyl acetate (MA), methyl propionate (MP) and ethyl propionate (MA); cyclic carboxylic acid esters, e.g., gamma-butyrolactone (GBL), and the like. As the cyclic carbonates, EC, PC, VC, and the like, are particularly preferred. If necessary, the aliphatic carboxylic acid esters are preferably used in an amount of 20% or less.

As lithium salts dissolved in the solvents, there may be used, for example, $LiClO_4$, $LiBF_4$, $LiPF_6$, $LiAlCl_4$, $LiSbF_6$, $LiSCN$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium bis(oxalato)borate (LiBOB), LiBoB, lithium lower-aliphatic carboxylic acid, lithium chloroborane, lithium tetraphenylborate, and imides, such as, $LiN(CF_3SO_2)(C_2F_5SO_2)$, $LiN(CF_3SO_2)_2$, $LiN(C_2F_5SO_2)_2$, $LiN(CF_3SO_2)(C_4F_9SO_2)$, and the like. These lithium salts may be used alone or in combination so long as the effects of the present invention are not impaired. $LiPF_6$ is particularly preferred.

To make the electrolyte incombustible, carbon tetrachloride, trifluorochloroethylene or a phosphorus-containing phosphate may be added to the electrolyte.

Further, solid electrolytes can be used. As inorganic solid electrolytes, $Li_4SiO_4$, $Li_4SiO_4$—Li1-LiOH, $xLi_3PO_4$-$(1-x)$$Li_4SiO_4$, $Li_2SiS_3$, $Li_3PO_4$—$Li_2S$—$SiS_2$, phosphorus-sulfide compounds, and the like, are preferably used.

As organic solid electrolytes, polyethylene oxide, polypropylene oxide, polyvinyl alcohol, polyvinylidene fluoride, fluoropropylene, derivatives thereof, mixtures thereof, and composites thereof, are preferably used.

Preferred materials for separators are polyethylene-based polymers, e.g., porous polyethylene, and polypropylene-based polymers.

Examples of suitable anode materials for that can be used in the present invention include compounds capable of adsorbing and desorbing lithium ions, e.g., lithium, lithium alloys, alloys, intermetallic compounds, carbonaceous materials, organic compounds, inorganic compounds, metal complexes, organic polymeric compounds, and the like. These compounds are preferably used alone or in combination so long as the effects of the present invention are not impaired.

As the lithium alloys, there may be preferably used, for example, Li—Al-based alloys, Li—Al—Mn-based alloys, Li—Al—Mg-based alloys, Li—Al—Sn-based alloys, Li—Al—In-based alloys, Li—Al—Cd-based alloys, Li—Al—Te-based alloys, Li—Ga-based alloys, Li—Cd-based alloys, Li—In-based alloys, Li—Pb-based alloys, Li—Bi-based alloys, and Li—Mg-based alloys.

As the alloys and intermetallic compounds, there may be used, for example, compounds of transition metals and silicon, compounds of transition metals and tin, etc. Compounds of nickel and silicon are particularly preferred.

Examples of preferred carbonaceous materials include coke, pyrolytic carbons, natural graphite, artificial graphite, meso carbon micro beads, graphite mesophase globules, vapor-grown carbons, glassy carbons, carbon fibers (polyacrylonitrile-based, pitch-based, cellulose-based, vapor-grown carbon-based fibers), amorphous carbons, and organic material-calcined carbons. These materials are preferably used alone or in combination so long as the effects of the present invention are not impaired.

As an external material, a metal can or a packaging material composed of aluminum and several polymer layers is preferably used.

MODE FOR THE INVENTION

The present invention will now be described in more detail with reference to the accompanying drawings (FIGS. 1 through 30) illustrating preferred examples. However, these examples are not to be construed as limiting the scope of the invention.

Example 1

Four liters of distilled water was put in a reactor (capacity: 4 L, power of rotating motor: 80 W), and then nitrogen was supplied to the reactor while bubbling at a rate of 1 liter/minute to remove dissolved oxygen. Stirring was conducted at 1,000 rpm while keeping the temperature of the reactor at 50° C.

A 2.4M aqueous metal solution containing nickel sulfate, manganese sulfate and cobalt sulfate in a molar ratio of 1.92:0.24:0.24 and a 0.2M aqueous ammonia solution were continuously fed to the reactor at rates of 0.3 and 0.03 liters/hour, respectively. A 4.8M aqueous sodium hydroxide solution was fed to the reactor to adjust the pH to 11.

At this time, the rotation speed of the impeller was set to 1,000 rpm. The flow rate was controlled so that the average residence time in the reactor was about 6 hours. After the reaction reached a steady state, the reactants were further stayed for a prolonged time to obtain a denser composite metal hydroxide.

After the feeding of the aqueous metal solution containing nickel sulfate, manganese sulfate and cobalt sulfate in a molar ratio of 1.92:0.24:0.24 was stopped, a mixture of nickel sulfate and manganese sulfate in a molar ratio of 1:1 was fed to the composite metal hydroxide. The reactants were allowed to react under the same conditions for 1~4 hours. Samples were collected 2~4 hours after the reaction at intervals of one hour.

Next, a spherical nickel-manganese-cobalt composite hydroxide was continuously collected through an overflow pipe. The composite metal hydroxide was filtered, washed with water, and dried in a hot-air dryer at 110° C. for 12 hours to obtain a precursor in the form of a metal composite oxide.

The precursor was mixed with lithium nitrate ($LiNO_3$) in a molar ratio of 1:1.15, heated at a rate of 4° C./min., pre-calcined at 200~400° C. for 8 hours, heated at a rate of 2° C./min., and calcined at 750~800° C. for 10~20 hours to obtain $Li\{[Ni_{0.8}Co_{0.1}Mn_{0.1}]_x[Ni_{1/2}Mn_{1/2}]_{1-x}\}O_2$ as a double-layer cathode active material powder consisting of $Li[Ni_{0.8}Co_{0.1}Mn_{0.1}]O_1$ as an inner layer material and $Li[Ni_{1/2}Mn_{1/2}]O_2$ as an outer layer material.

Figure 4:
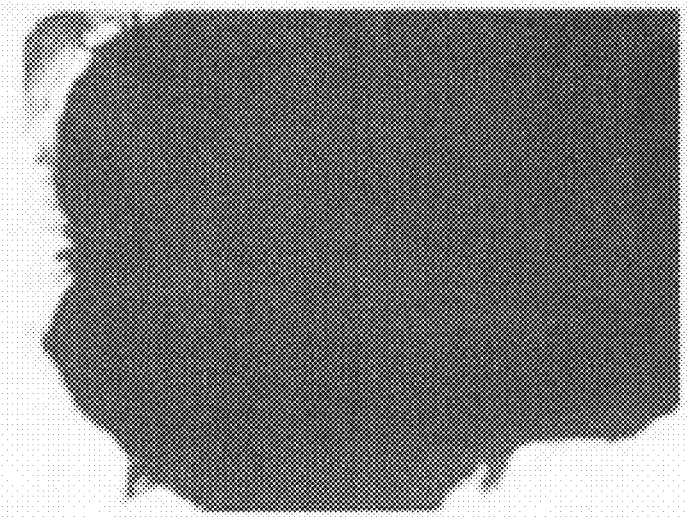
FIG. 4 is a photograph of a powder obtained after $(Ni_{0.8}Co_{0.1}Mn_{0.1})(OH)_2$ is encapsulated with $(Ni_{0.5}Mn_{0.5})(OH)_2$ for 2~3 hours.

FIG. 2 is a photograph of a composite oxide powder obtained after $(Ni_{0.8}Co_{0.1}Mn_{0.1})(OH)_2$ was dried in a hot-air dryer at 110° C. for 12 hours, FIG. 3 is a photograph of a powder obtained after $(Ni_{0.8}Co_{0.1}Mn_{0.1})(OH)_2$ was encapsulated with $(Ni_{0.5}Mn_{0.5})(OH)_2$ for 1~2 hours, FIG. 4 is a photograph of a powder obtained after $(Ni_{0.8}Co_{0.1}Mn_{0.1})(OH)_2$ was encapsulated with $(Ni_{0.5}Mn_{0.5})(OH)_2$ for 2~3 hours, and FIG. 5 is a photograph of a powder obtained after $(Ni_{0.8}Co_{0.1}Mn_{0.1})(OH)_2$ was encapsulated with $(Ni_{0.5}Mn_{0.5})(OH)_2$ for 4 hours.

The color of the $(Ni_{0.8}Co_{0.1}Mn_{0.1})(OH)_2$ powder shown in FIG. 2 is brown, while the color of the $(Ni_{0.8}Co_{0.1}Mn_{0.1})(OH)_2$ powder encapsulated with the $(Ni_{0.5}Mn_{0.5})(OH)_2$ powder shown in FIGS. 3 to 5 is changed to black (because the $(Ni_{0.5}Mn_{0.5})(OH)_2$ powder is black).

FIG. 9 shows field emission-scanning electron microscopy (FE-SEM) images of powders $(Ni_{0.8}Co_{0.1}Mn_{0.1})(OH)_2$ and $\{(Ni_{0.8}Co_{0.1}Mn_{0.1})_x(Ni_{1/2}Mn_{1/2})_{1-x}\}(OH)_2$ with different encapsulation time. The $\{(Ni_{0.8}Co_{0.1}Mn_{0.1})_x(Ni_{1/2}Mn_{1/2})_{1-x}\}(OH)_2$ powder particles were spherical like the shape of the $(Ni_{0.8}Co_{0.1}Mn_{0.1})(OH)_2$ particles. However, as the encapsulation time increased, the surface of the $\{(Ni_{0.8}Co_{0.1}Mn_{0.1})_x(Ni_{0.45}Co_{0.1}Mn_{0.45})_{1-x}\}(OH)_2$ powder was formed in the shape of a skein and was thick as compared to the $(Ni_{0.8}Co_{0.1}Mn_{0.1})(OH)_2$ powder.

FIG. 13 shows energy dispersive X-ray spectra (EDX) of a powder obtained after $(Ni_{0.8}Co_{0.1}Mn_{0.1})(OH)_2$ was encapsulated with $(Ni_{0.5}Mn_{0.5})(OH)_2$ for 4 hours. As shown in FIG. 13, a larger amount of Mn is present on the surface encapsulated with $(Ni_{1/2}Mn_{1/2})(OH)_2$, and larger amounts of Co and Ni are present in the center of the powder particles. These observations indicate that the inner layer was composed of the $(Ni_{0.8}Co_{0.1}Mn_{0.1})(OH)_2$ powder and the outer layer was composed of the $(Ni_{1/2}Mn_{1/2})(OH)_2$ powder to form a double-layer structure. The double-layer metal composite oxide powder was spherical, had an average particle diameter of 5~10 □, and had a tap density of 1.7~2.0 g/cm³.

FIG. 14 is a transmission electron microscope (TEM) image of an intermediate powder of $\{(Ni_{0.8}Co_{0.1}Mn_{0.1})_x(Ni_{1/2}Mn_{1/2})_{1-x}\}(OH)_2$ with an encapsulation time of 3 hours. As is apparent from the image, a double-layer is formed to a thickness of 100~150 nm on the surface.

92 g of the double-layer composite metal hydroxide and 79.3 g of lithium monohydrate were mixed, heated at a rate of 4° C./min. in an oxidizing atmosphere of oxygen, pre-calcined at 200~400° C. for 5 hours, heated at a rate of 2° C./min., and calcined at 700~900° C. for 20 hours. The obtained powder had a tap density of 2.0~2.3 m³/g.

FIG. 15 is an FE-SEM image of a powder obtained after $\{(Ni_{0.8}Co_{0.1}Mn_{0.1})_x(Ni_{1/2}Mn_{1/2})_{1-x}\}(OH)_2$ encapsulated for 1~4 hours was calcined at 700~800° C. for 20 hours and ground. The image demonstrates that a double-layer is formed in a good shape.

As evident from FIGS. 2, 9, 13, 14 and 15, the double-layer structure comprises the $(Ni_{0.8}Co_{0.1}Mn_{0.1})(OH)_2$ powder as an inner layer material and the $(Ni_{0.5}Mn_{0.5})(OH)_2$ powder as an outer layer material. The double-layer metal composite oxide powder was spherical, had an average particle diameter of 5~15 □, and had a tap density of 1.7~2.0 g/cm³.

The double-layer cathode active material for a lithium secondary battery thus prepared, acetylene black as a conductive agent and polyvinylidene fluoride (PVdF) as a binder were mixed in a weight ratio of 80:10:10 to prepare a slurry. The slurry was uniformly coated to a thickness of 20 □ on an aluminum foil, and dried under vacuum at 120° C. to a cathode for a lithium secondary battery.

A coin-type battery was fabricated by using the cathode, a lithium foil as a counter electrode, a porous polyethylene film (thickness: 25 □, Celgard 2300, Celgard LLC) as a separator, and a 1M LiPF$_6$ solution in a mixed solvent of ethylene carbonate and diethyl carbonate (1:1 by volume) as a liquid electrolyte solution in accordance with procedures well known in the art. The characteristics of the cathode active material in the coin-type battery were evaluated using an electrochemical analysis system (Toyo System, Toscat 3100U) in the voltage range of 3.0~4.3 V.

Example 2

Calcining was carried out at 770° C. for 20 hours to fabricate a half battery.

Example 3

The double-layer composite and ammonium fluoride (NH$_4$F) and metal hydroxide (Ox) were mixed in a molar ratio 1:0.05, and calcined at 770° C. for 20 hours to fabricate a half battery.

Example 4

A powder was prepared and a coin-type half battery was fabricated in the same manner as in Example 1, except that an aqueous metal solution containing nickel sulfate, manganese sulfate and cobalt sulfate in a molar ratio of 1.08:1.08:0.24 was added and reacted for 3 hours.

FIG. 10 is an FE-SEM image of a $\{(Ni_{0.8}Co_{0.1}Mn_{0.1})_x(Ni_{0.45}Co_{0.1}Mn_{0.45})_{1-x}\}(OH)_2$ powder with an encapsulation time of 3 hours. As shown in FIG. 10, the $\{(Ni_{0.8}Co_{0.1}Mn_{0.1})_x(Ni_{0.45}Co_{0.1}Mn_{0.45})_{1-x}\}(OH)_2$ powder particles are spherical like the shape of the $(Ni_{0.8}Co_{0.1}Mn_{0.1})(OH)_2$ particles shown in FIG. 9(1). However, the surface of the $\{(Ni_{0.8}Co_{0.1}Mn_{0.1})_x(Ni_{0.45}Co_{0.1}Mn_{0.1})_{1-x}\}(OH)_2$ powder was formed in the shape of a skein as compared to the $(Ni_{0.8}Co_{0.1}Mn_{0.1})(OH)_2$ powder.

Example 5

A powder was prepared in the same manner as in Example 4, and calcined at 770° C. for 20 hours to fabricate a half battery.

Example 6

A powder was prepared and a coin-type half battery was fabricated in the same manner as in Example 1, except that an aqueous metal solution containing nickel sulfate, manganese sulfate and cobalt sulfate in a molar ratio of 0.96:0.96:0.48 was added and reacted for 3 hours.

FIG. 11 is an FE-SEM image of a $\{(Ni_{0.8}Co_{0.1}Mn_{0.1})_x(Ni_{0.45}Co_{0.1}Mn_{0.45})_{1-x}\}(OH)_2$ powder with an encapsulation time of 3 hours. As shown in FIG. 10, the $\{(Ni_{0.8}Co_{0.1}Mn_{0.1})_x(Ni_{0.45}Co_{0.1}Mn_{0.45})_{1-x}\}(OH)_2$ powder particles are spherical like the shape of the $(Ni_{0.8}Co_{0.1}Mn_{0.1})(OH)_2$ particles shown in FIG. 9(1). However, the surface of the $\{(Ni_{0.8}Co_{0.1}Mn_{0.1})_x(Ni_{0.45}Co_{0.1}Mn_{0.45})_{1-1}\}(OH)_2$ powder was formed in the shape of a skein as compared to the $(Ni_{0.8}Co_{0.1}Mn_{0.1})(OH)_2$ powder.

Example 7

A powder was prepared in the same manner as in Example 6, and calcined at 770° C. for 20 hours to fabricate a half battery.

Example 8

A powder was prepared in the same manner as in Example 1, except that an aqueous metal solution containing nickel sulfate and cobalt sulfate in a molar ratio of 1.92:0.48 was added to reach a steady state, and then an aqueous metal solution containing nickel sulfate, manganese sulfate and cobalt sulfate in a molar ratio of 1.08:1.08:0.24 was added and reacted for 1~3 hours.

FIG. 6 is a photograph of a composite oxide powder obtained after $(Ni_{0.8}Co_{0.2})(OH)_2$ was dried in a hot-air dryer at 110° C. for 12 hours, FIG. 7 is a photograph of a powder obtained after $(Ni_{0.8}Co_{0.2})(OH)_2$ was encapsulated with $(Ni_{0.45}Co_{0.1}Mn_{0.45})(OH)_2$ for 1~2 hours, and FIG. 8 is a photograph of a powder obtained after $(Ni_{0.8}Co_{0.2})(OH)_2$ was encapsulated with $(Ni_{0.45}Co_{0.1}Mn_{0.45})(OH)_2$ for 3 hours.

The color of the $(Ni_{0.8}Co_{0.2})(OH)_2$ powder shown in FIG. 6 is yellowish green, while the color of the $(Ni_{0.8}Co_{0.2})(OH)$ powder encapsulated with the $(Ni_{0.45}Co_{0.1}Mn_{0.45})(OH)_2$ powder shown in FIGS. 7 and 8 is changed to black with encapsulation time (because the $(Ni_{0.45}Co_{0.1}Mn_{0.45})(OH)_2$ powder is black).

FIG. 12 shows FE-SEM images of $(Ni_{0.8}Co_{0.2})(OH)_2$ and a precursor powder $(Ni_{0.8}Co_{0.2})_x(Ni_{0.45}Co_{0.1}Mn_{0.45})_{1-x}(OH)_2$. As shown in FIG. 12, the $(Ni_{0.8}Co_{0.2})_x(Ni_{0.45}Co_{0.1}Mn_{0.45})_{1-x}(OH)_2$ powder particles are spherical. However, the surface of the $\{(Ni_{0.8}Co_{0.1}Mn_{0.1})_x(Ni_{0.45}Co_{0.1}Mn_{0.45})_{1-x}\}(OH)_2$ powder was formed in the shape of a skein as compared to the $(Ni_{0.8}Co_{0.2})(OH)_2$ powder.

As can be seen from FIGS. 6, 7, 8 and 12, a double-layer is formed in a good shape from the two-component composite oxides.

Example 9

A powder was prepared in the same manner as in Example 8, and calcined at 720° C. for 20 hours to fabricate a half battery.

Comparative Example 1a

A powder was prepared in the same manner as in Example 1, except that $[Ni_{0.8}Co_{0.1}Mn_{0.1}](OH)_2$ was prepared.

FIG. 16 shows X-ray diffraction patterns of the precursor powder prepared in Comparative Example 1 and the powders prepared in Example 1 with different encapsulation time. As shown in FIG. 16, as the encapsulation time increases, the characteristics of the powders constituting double-layers appear as diffraction patterns.

Comparative Example 1b

A powder was prepared in the same manner as in Example 1, except that $[Ni_{0.8}Co_{0.2}](OH)_2$ was prepared.

FIG. 17 shows X-ray diffraction patterns of the precursor powder prepared in Comparative Example 1(b) and the powders prepared in Example 8 with different encapsulation time. As shown in FIG. 17, as the encapsulation time increases, the characteristics of the powders constituting double-layers appear as diffraction patterns.

Comparative Example 2

Powders were prepared in the same manner as in Examples 2, 5 and 7, except that the $(Ni_{0.8}Co_{0.1}Mn_{0.1})(OH)_2$ prepared in Comparative Example 1(a) was sintered at 750° C. for 20 hours.

FIG. 18 shows X-ray diffraction patterns of the sintered powder particles prepared in Comparative Example 2 and the sintered powder particles prepared in Example 2, and FIG. 19 shows X-ray diffraction patterns of the sintered powder particles prepared in Comparative Example 2 and the double-layer sintered powder particles prepared in Examples 2 with an encapsulation time of 3 hours, the sintered powder particles prepared in Example 5 and the sintered powder particles prepared in Example 7. In the diffraction peaks of the powders, peaks corresponding to (006) and (102) planes and peaks corresponding to (018) and (110) planes were clearly separated. The peak intensity ratio between (003) and (104) planes was higher than 1, which demonstrates that the lithium composite oxide has a hexagonal-$NaFeO_2$ structure belonging to the space group R3m and is a layered compound having superior crystallinity even after the formation of a double-layer structure.

Comparative Example 3

Powders were prepared in the same manner in Examples 2, 5 and 7, except that the sintered powder particles prepared in Comparative Example 2 were used.

FIG. 20 is charge-discharge curves of the sintered powder particles prepared in Comparative Example 2 and the sintered powder particles prepared in Example 2 with different encapsulation time charged and discharged to the voltage range of 3.0~4.3V and a constant current of 0.4 mA. The double-layer cathode active material $Li\{(Ni_{0.8}Co_{0.1}Mn_{0.1})_x(Ni_{1/2}Mn_{1/2})_{1-x}\}O_2$ prepared in Example 2 showed a lower discharge capacity than the $Li[Ni_{0.8}Co_{0.1}Mn_{0.1}]O_2$ powder prepared in Comparative Example 1 and calcined in Comparative Example 2. However, the double-layer cathode active material $Li\{(Ni_{0.8}Co_{0.1}Mn_{0.1})_x(Ni_{1/2}Mn_{1/2})_{1-x}\}O_2$ showed a higher discharge voltage in the voltage range of 3.5~3.8V than $Li[Ni_{0.8}Co_{0.1}Mn_{0.1}]O_2$, which is a characteristic value of the $Li[Ni_{0.5}Mn_{0.5}]O_2$ powder. The order in the discharge capacity of the powder particles at the second cycle was as follows: Comparative Example 1>Example 2 (as the encapsulation time increased (2, 3, 4 hours), the discharge capacity was increased). The double-layer cathode active material prepared in Example 2 showed a slightly lower discharge capacity and a higher discharge voltage than the powder prepared in Comparative Example 1.

FIG. 21 shows charge-discharge curves of the sintered powder particles prepared in Comparative Example 2, the double-layer cathode active material powder prepared in Example 2 with an encapsulation time of 3 hours, the sintered powder particles prepared in Example 5 and the sintered powder particles prepared in Example 7 charged and discharged to the voltage range of 3.0~4.3V and a constant current of 0.4 mA. The cathode active material $Li\{(Ni_{0.8}Co_{0.1}Mn_{0.1})_x(Ni_{1/2}Mn_{1/2})_{1-x}\}O_2$ prepared in Example 2 with an encapsulation time of 3 hours showed a lower discharge capacity than the $Li[Ni_{0.8}Co_{0.1}Mn_{0.1}]O_2$ powder prepared in Comparative Example 1 and calcined in Comparative Example 2. However, the cathode active material $Li\{(Ni_{0.8}Co_{0.1}Mn_{0.1})_x(Ni_{1/2}Mn_{1/2})_{1-x}\}O_2$ prepared in Example 2 showed a higher discharge voltage in the voltage range of 3.5~3.8V than $Li[Ni_{0.8}Co_{0.1}Mn_{0.1}]O_2$, which is a characteristic value of the $Li[Ni_{0.5}Mn_{0.5}]O_2$ powder.

The cathode active material $Li[(Ni_{0.8}Co_{0.1}Mn_{0.1})_x(Ni_{0.45}Co_{0.1}Mn_{0.45})_{1-x}]O_2$ prepared in Example 5 with an encapsulation time of 3 hours showed a lower discharge capacity than the $Li[Ni_{0.8}Co_{0.1}Mn_{0.1}]O_2$ powder prepared in Comparative Example 1 and calcined in Comparative Example 2 and the $Li\{(Ni_{0.8}Co_{0.1}Mn_{0.1})_x(Ni_{1/2}Mn_{1/2})_{1-x}\}O_2$ prepared in Example 2 with an encapsulation time of 3 hours. The cathode active material $Li[(Ni_{0.8}Co_{0.1}Mn_{0.1})_x(Ni_{0.45}Co_{0.1}Mn_{0.45})_{1-x}]O_2$ prepared in Example 5 with an encapsulation time 3 hours showed a lower discharge voltage even in the voltage range of 3.5~3.8V than the $Li[Ni_{0.8}Co_{0.1}Mn_{0.1}]O_2$ powder prepared in Comparative Example 1 and calcined in Comparative Example 2. The cathode active material $Li[(Ni_{0.8}Co_{0.1}Mn_{0.1})_x(Ni_{0.4}Co_{0.2}Mn_{0.4})_{1-x}]O_2$ prepared in Example 7 with an encapsulation time of 3 hours showed a lower discharge capacity than the $Li[Ni_{0.8}Co_{0.1}Mn_{0.1}]O_2$ powder prepared in Comparative Example 1 and calcined in Comparative Example 2 and the Li{$(Ni_{0.8}Co_{0.1}Mn_{0.1})_x$ $(Ni_{1/2}Mn_{1/2})_{1-x}$}$O_2$ prepared in Example 1 with an encapsulation time of 3 hours. The cathode active material Li[$(Ni_{0.8}Co_{0.1}Mn_{0.1})_x(Ni_{0.4}Co_{0.2}Mn_{0.4})_{1-x}$]$O_2$ prepared in Example 7 with an encapsulation time of 3 hours showed a lower discharge voltage even in the voltage range of 3.5~3.8V than the Li[$Ni_{0.8}Co_{0.1}Mn_{0.1}$]$O_2$ powder prepared in Comparative Example 1 and calcined in Comparative Example 2.

The order in the discharge capacity of the cathode active materials at the second cycle was as follows: Comparative Example 1>Example 2>Example 5>Example 7. The double-layer active material prepared in Example 2 with an encapsulation time of 3 hours showed better characteristics than that prepared in Comparative Example 1.

Comparative Example 4

Powders were prepared in the same manner as in Examples 5 and 7, except that the sintered powder particles prepared in Comparative Example 2 and the double-layer cathode active material powder prepared in Example 2 with an encapsulation time of 3 hours were used.

FIG. 22 shows discharge capacity of the sintered powder particles prepared in Comparative Example 2 and the double-layer powders prepared in Example 2 with different encapsulation time according to increasing number of cycles in the voltage range of 3.0~4.3V and a constant current of 0.4 mA.

As a result of charge and discharge at 70 cycles or less, the sintered powder particles prepared in Comparative Example 2 showed a decrease in capacity, while the double-layer powders prepared in Example 2 with different encapsulation time showed better cycle characteristics than the sintered powder prepared in Comparative Example 2.

FIG. 23 shows discharge capacity of the sintered powder particles prepared in Comparative Example 2 and the double-layer sintered powders prepared in Examples 2, 5 and 7 with an encapsulation time of 3 hours according to increasing number of cycles in the voltage range of 3.0~4.3V and a constant current of 0.4 mA.

The double-layer sintered powders prepared in Examples 2, 5 and 7 showed better cycle characteristics than the sintered powder prepared in Comparative Example 2.

Comparative Example 5

Powders were prepared in the same manner as in Examples 2, 5 and 7, except that the sintered powder prepared in Comparative Example 2 was used.

FIG. 24 shows differential scanning calorimetry (DSC) of the sintered powder prepared in Comparative Example 2 and the double-layer sintered powders prepared in Example 2 with different encapsulation time charged to a voltage of 4.3 V and a constant current of 0.4 mA. In the Li[$Ni_{0.8}Co_{0.1}Mn_{0.1}$]$O_2$ powder, an exothermic peak began to appear at 174.7° C. and a main exothermic peak was observed at around 218.7° C. In the sintered powder prepared in Example 2 with an encapsulation time of 2 hours, an exothermic peak began to appear at about 200.8° C., and a main exothermic peak was observed at around 238.3° C. The main exothermic peak showed an increase by about 20° C., compared to that of the sintered powder prepared in Comparative Example 2. In the sintered powder prepared in Example 2 with an encapsulation time of 3 hours, an exothermic peak began to appear at about 217.2° C. and a main exothermic peak was observed at 250.2° C. The main exothermic peak showed an increase by about 30° C., compared to that of the sintered powder prepared in Comparative Example 2. In the sintered powder prepared in Example 2 with an encapsulation time of 4 hours, an exothermic peak began to appear at 220° C. and a main exothermic peak was observed at 265.8° C. The main exothermic peak showed an increase by about 50° C., compared to that of the sintered powder prepared in Comparative Example 2. The longer the encapsulation time, the better the thermal safety.

FIG. 25 shows differential scanning calorimetry (DSC) of the sintered powder prepared in Comparative Example 2 and the sintered powders prepared in Examples 2, 5 and 7 charged to a voltage of 4.3 V and a constant current of 0.4 mA. In the Li[$Ni_{0.8}Co_{0.1}Mn_{0.1}$]$O_2$ powder, an exothermic peak began to appear at 174.7° C. and a main exothermic peak was observed at around 218.7° C. In the sintered powder prepared in Example 2 with an encapsulation time of 3 hours, an exothermic peak began to appear at about 217.2° C., and a main exothermic peak was observed at 250.2° C. The main exothermic peak showed an increase by about 32° C., compared to that of the sintered powder prepared in Comparative Example 2. In the sintered powder prepared in Example 5, an exothermic peak began to appear at about 216.7° C. and a main exothermic peak was observed at 247.1° C. The main exothermic peak showed an increase by about 30° C., compared to that of the sintered powder prepared in Comparative Example 2. In the sintered powder prepared in Example 7, an exothermic peak began to appear at 206.5° C. and a main exothermic peak was observed at 249.8° C. The main exothermic peak showed an increase by about 30° C., compared to that of the sintered powder prepared in Comparative Example 2.

These results from Comparative Example 5 reveal that although double layers were formed by varying the content of cobalt sulfate, the sintered powders capable of forming the double layers showed superior thermal safety to the sintered powder prepared in Comparative Example 2.

Comparative Example 6

A double-layer powder was prepared with an encapsulation time of 2 hours in the same manner as in Example 3, except that lithium nitrate, lithium fluoride and the $(Ni_{0.8}Co_{0.1}Mn_{0.1})OH_2$ powder prepared in Comparative Example 1(a) were mixed in a molar ratio of 1.12:0.05:1 and was then calcined at 770° C. for 20 hours.

FIGS. 26 and 27 show differential scanning calorimetry (DSC) of the cathode active material Li[$(Ni_{0.8}Co_{0.1}Mn_{0.1})$]$O_{1.95}F_{0.05}$ prepared in Comparative Example 6 and the cathode active material Li{$(Ni_{0.8}Co_{0.1}Mn_{0.1})_x(Ni_{1/2}Mn_{1/2})_{1-x}$}$O_{1.95}F_{0.05}$ powders prepared in Example 3 charged to 4.3V, respectively.

The cathode active material prepared by anion replacing with lithium fluoride, followed by calcining, in Comparative Example 6 showed superior thermal safety to the cathode active material prepared in Comparative Example 1(a).

The calcined double-layer cathode active material prepared in Example 3 showed superior thermal safety to the cathode active material prepared in Example 1 with an encapsulation time of 2 hours and calcined in Example 2.

Comparative Example 7

A powder was prepared in the same manner as in Example 8 and calcined in the same manner as in Example 9, except that the [$Ni_{0.8}Co_{0.2}$]$(OH)_2$ prepared in Comparative Example 1(b) was sintered at 720° C. for 20 hours. In the diffraction peaks of the powders, peaks corresponding to (006) and (102) planes and peaks corresponding to (018) and (110) planes were clearly separated. The peak intensity ratio between (003) and (104) planes was higher than 1, which demonstrates that the lithium composite oxide has a hexagonal-NaFeO$_2$ structure belonging to the space group R3m and is a layered compound having superior crystallinity even after the formation of a double-layer structure.

Comparative Example 8

In this comparative example, the sintered powder prepared in Comparative Example 7 and the sintered powders prepared in Example 9 were used.

FIG. 29 shows discharge capacity of the intermediate sintered powder prepared in Comparative 1(b) and the powders prepared in Example 9 with different encapsulation time according to increasing number of cycles in the voltage range of 3.0~4.3V and a constant current of 0.4 mA. As shown in FIG. 28, the sintered powders prepared in Example 9 show lower discharge capacity than the sintered powder prepared in Comparative Example 1(b). But, the sintered powders prepared in Example 9 show higher discharge voltages in the voltage range of 3.5~3.8V than the sintered powder prepared in Comparative Example 1(b).

Comparative Example 9

In this comparative example, the sintered powder prepared in Comparative Example 7 and the sintered powders prepared in Example 9 were used.

FIG. 30 shows differential scanning calorimetry (DSC) of the sintered powder prepared in Comparative Example 7 and the sintered powders prepared in Example 9 with different encapsulation time charged to 4.2V. In the Li[Ni$_{0.8}$Co$_{0.2}$]O$_2$ powder, an exothermic peak began to appear at 200° C. and a main exothermic peak was observed at around 220° C. Whereas, in the sintered powder prepared in Example 9 with an encapsulation time of 3 hours, an exothermic peak began to appear at about 210° C. and a main exothermic peak was observed at around 255° C. In addition, the amount of heat emission in the sintered powder prepared in Example 9 with an encapsulation time of 3 hours was decreased to about three fourth of that of the Li[Ni$_{0.8}$Co$_{0.2}$]O$_2$ powder.

Although the preferred embodiments of the present invention have been disclosed for illustrative purposes, those skilled in the art will appreciate that various modifications and changes are possible, without departing from the scope and spirit of the invention based on the preferred embodiments. It is to be understood that such modifications and changes are within the accompanying claims.

INDUSTRIAL APPLICABILITY

The cathode active material with both a layered rocksalt-type structure and a double-layer structure prepared by hydroxide co-precipitation comprises a nickel-based cathode active material having high-capacity characteristics as an inner layer material and a transition metal mixture-based cathode active material having superior thermal safety as an outer layer material facing an electrolyte. Therefore, the cathode active material of the present invention shows high capacity, high charge density, improved cycle characteristics, and superior thermal safety.

The invention claimed is:

1. A double-layer cathode active material particle for a lithium secondary battery, comprising:
   an inner layer; and
   an outer layer encapsulating the inner layer and facing an electrolyte;
   wherein the inner layer comprises an inner layer cathode active material and the outer layer comprises an outer layer cathode active material, and the inner layer cathode active material and the outer layer cathode active material are different from each other,
   wherein the outer layer has a thickness that is 30% or less relative to a total thickness of the inner layer and the outer layer,
   wherein the inner layer cathode active material is Li$_{1+\delta}$[Co$_a$Mn$_b$Ni$_{1-(a+b)}$]O$_2$ (0≤δ≤1/5, 0<a≤0.5, 0<b≤0.2, and 0<a=b≤0.5),
   wherein the outer layer cathode active material is Li$_{1+\delta}$[Ni$_x$Mn$_x$Co$_{1-2x}$]O$_2$ (0≤δ≤1/5, and 0<x≤0.45),
   the inner layer cathode active material has an average particle diameter of 0.1~2 μm, and the double-layer cathode active material particle has an average particle diameter of 5~20 μm,
   wherein a Ni molar ratio of the inner layer is higher than a Ni molar ratio of the outer layer, and the Ni molar ratio of the inner layer and the Ni molar ratio of the outer layer are continuously changing between the inner layer and the outer layer, and
   wherein a concentration of Co in the inner layer and a concentration of Co in the outer layer are same, and a connection of Mn in the inner layer is lower than a concentration of Mn in the outer layer, and
   the double-layer cathode active material particle for a lithium secondary battery is prepared by a method comprising the step of:
   simultaneously mixing a nickel-based metal precursor, an aqueous ammonia solution and a basic solution in a reactor to obtain a spherical precipitate (step 1);
   simultaneously adding a transition metal mixture-based metal precursor having lower Ni molar ratio than the nickel-based metal precursor, an aqueous ammonia solution and a basic solution to the spherical precipitate, followed by mixing, to obtain a precipitate of a double-layer composite metal hydroxide encapsulated with a transition metal hydroxide (step 2);
   drying or heating the precipitate of a double-layer composite metal hydroxide obtained in step 2 to obtain a double-layer composite metal hydroxide/oxide (step 3); and mixing and calcining the double-layer composite metal hydroxide/oxide with a lithium precursor to obtain the double-layer cathode active material particle comprising the inner layer and the outer layer.

2. The double-layer cathode active material particle according to claim 1, wherein, in the Li$_{1+\delta}$[Co$_a$Mn$_b$Ni$_{1-(a+b)}$]O$_2$, the oxidation number of Co, Mn and Ni is +3.

3. The double-layer cathode active material particle according to claim 1, wherein, in the Li$_{1+\delta}$[Ni$_x$Mn$_x$Co$_{1-2x}$]O$_2$, the oxidation number of Ni is +2, that of Mn is +4, and that of Co is +3.

4. The double-layer cathode active material particle according to claim 1, wherein the thickness of the outer layer is 10% or lower, relative to the total thickness of the inner layer and the outer layer.

5. The double-layer cathode active material particle according to claim 1, wherein, in step 1, the precursor is an aqueous solution containing at least two metal salts, the molar ratio of the ammonia to the metal salts is between 0.2:1 and 0.4:1, the pH of the reaction solution is adjusted to 10.5~12, and the reaction is carried out for 2~10 hours.

6. The double-layer cathode active material particle according to claim 1, wherein, in step 2, the reaction time is controlled to 1~10 hours to regulate the thickness of the outer layer.

7. The double-layer cathode active material particle according to claim 1, wherein, in step 3, the drying is carried out at 110° C. for 15 hours or the heating is carried out at 400~550° C. for 5~10 hours.

8. The double-layer cathode active material particle according to claim 1, wherein step 3 includes the sub-steps of pre-calcining at 400~650° C. for 5 hours, calcining at 700~1,100° C. for 10 hours, and annealing at 700° C. for 10 hours.

9. The double-layer cathode active material particle according to claim 1, wherein, in step 4, the dried composite metal hydroxide/oxide and the lithium precursor are mixed in an aqueous solution containing a chelating agent selected from citric acid, tartaric acid, glycolic acid and maleic acid, and then the distilled water is removed.

10. A lithium secondary battery comprising the double-layer cathode active material particle according to claim 1.

11. A double-layer cathode active material particle for a lithium secondary battery, comprising:
an inner layer; and
an outer layer encapsulating the inner layer and facing an electrolyte;
wherein the inner layer comprises an inner layer cathode active material and the outer layer comprises an outer layer cathode active material, and the inner layer cathode active material and the outer layer cathode active material are different from each other,
wherein the outer layer has a thickness that is 30% or less relative to a total thickness of the inner layer and the outer layer,
wherein the inner layer cathode active material is $Li_{1+\delta}[Co_aMn_bNi_{1-(a+b)}]O_2$ ($0 \leq \delta \leq 1/5$, $0 < a \leq 0.5$, $0 < b \leq 0.2$, and $0 < a+b \leq 0.5$), and the oxidation number of Co, Mn, and Ni is +3, wherein the outer layer cathode active material is $Li_{1+\delta}[Ni_xMn_xCo_{1-2x}]O_2$ ($0 \leq \delta \leq 1/5$, and $0 < x \leq 0.45$), and the oxidation number of Ni is +2, that of Mn is +4 and that of Co is +3, and the inner layer cathode active material has an average particle diameter of 0.1~2 μm, and the double-layer cathode active material particle has an average particle diameter of 5~20 μm, wherein a Ni molar ratio of the inner layer is higher than a Ni molar ratio of the outer layer, and the Ni molar ratio of the inner layer and the Ni molar ratio of the outer layer are continuously changing between the inner layer and the outer layer, and wherein a concentration of Co in the inner layer and a concentration of Co in the outer layer are same, and a connection of Mn in the inner layer is lower than a concentration of Mn in the outer layer, and the double-layer cathode active material particle for a lithium secondary battery is prepared by a method comprising the step of:

simultaneously mixing a nickel-based metal precursor, an aqueous ammonia solution and a basic solution in a reactor to obtain a spherical precipitate (step 1);

simultaneously adding a transition metal mixture-based metal precursor having lower N molar ratio than the nickel-based metal precursor, an aqueous ammonia solution and a basic solution to the spherical precipitate, followed by mixing, to obtain a precipitate of a double-layer composite metal hydroxide encapsulated with a transition metal hydroxide (step 2);

drying or heating the precipitate of a double-layer composite metal hydroxide obtained in step 2 to obtain a double-layer composite metal hydroxide/oxide (step 3); and mixing and calcining the double-layer composite metal hydroxide/oxide with a lithium precursor to obtain the double-layer cathode active material particle comprising the inner layer and the outer layer.

12. The double-layer cathode active material particle according to claim 11, wherein the outer layer has a thickness of 10% or lower, relative to the total thickness of the inner layer and the outer layer.

* * * * *